United States Patent
Ito

(10) Patent No.: US 8,627,660 B2
(45) Date of Patent: Jan. 14, 2014

(54) CONTROL DEVICE FOR INTERNAL COMBUSTION ENGINE WITH SUPERCHARGER

(75) Inventor: Shinya Ito, Toyota (JP)

(73) Assignee: Toyota Jidosha Kabushiki Kaisha, Aichi-Ken (JP)

(*) Notice: Subject to any disclaimer, the term of this patent is extended or adjusted under 35 U.S.C. 154(b) by 198 days.

(21) Appl. No.: 13/380,769

(22) PCT Filed: Dec. 2, 2010

(86) PCT No.: PCT/JP2010/071574
§ 371 (c)(1),
(2), (4) Date: Dec. 23, 2011

(87) PCT Pub. No.: WO2012/073365
PCT Pub. Date: Jun. 7, 2012

(65) Prior Publication Data
US 2012/0137675 A1 Jun. 7, 2012

(51) Int. Cl.
*F02D 23/00* (2006.01)
*F02B 33/44* (2006.01)
*F02M 25/07* (2006.01)

(52) U.S. Cl.
USPC .......... 60/602; 60/600; 60/605.2; 123/568.11

(58) Field of Classification Search
USPC ........... 60/600, 602, 605.2, 611; 123/568.11, 123/568.12; 701/108
See application file for complete search history.

(56) References Cited

U.S. PATENT DOCUMENTS 6,314,736 B1 * 11/2001 Daudel et al. .................. 60/602
6,932,565 B2 * 8/2005 Garrett et al. ................. 415/119
7,107,142 B2 * 9/2006 Harada et al. ................. 701/114
7,434,398 B2 * 10/2008 Olsson et al. ................... 60/602
2006/0137660 A1 * 6/2006 Shirakawa et al. ........... 123/493
2011/0023479 A1 * 2/2011 Sun et al. ........................ 60/602

FOREIGN PATENT DOCUMENTS

| JP | 09-072279 A | 3/1997 | |
| JP | 11-257011 A | 9/1999 | |
| JP | 11-257082 A | 9/1999 | |
| JP | 2006-183558 A | 7/2006 | |
| JP | 2008-280916 A | 11/2008 | |
| JP | 2009-281144 A | 12/2009 | |
| JP | 2010174813 A | * 8/2010 | .............. F02B 37/24 |

OTHER PUBLICATIONS

Machine translation obtain from epo.org of JP2010-174813A published Aug. 12, 2012 (see attached).*

* cited by examiner

*Primary Examiner* — Thomas Denion
*Assistant Examiner* — Ngoc T Nguyen
(74) *Attorney, Agent, or Firm* — Sughrue Mion, PLLC

(57) ABSTRACT

In an internal combustion engine with a variable nozzle vane turbocharger, when the flow rate (VN passage flow rate) of exhaust gas passing through nozzle vanes has reached a spatial resonance region in an exhaust gas passage space between a turbine housing and a catalyst during acceleration, the flow rate is increased so that the spatial resonance region can be quickly passed. When the flow rate (VN passage flow rate) of exhaust gas passing through the nozzle vanes has reached the spatial resonance region during deceleration, the flow rate is decreased so that the spatial resonance region can be quickly passed. Such a control can reduce a period of time during which the frequency of pressure pulsation occurring at the rear ends of the nozzle vanes is amplified in the spatial resonance region, whereby noise caused by the pressure pulsation can be reduced.

12 Claims, 12 Drawing Sheets

CONTROL DEVICE FOR INTERNAL COMBUSTION ENGINE WITH SUPERCHARGER

CROSS REFERENCE TO RELATED APPLICATIONS

This application is a National Stage of International Application No. PCT/JP2010/071574 filed Dec. 2, 2010 the contents of all of which are incorporated herein by reference in their entirety.

TECHNICAL FIELD

The present invention relates to control devices for internal combustion engines with a supercharger, and more particularly, to control devices for internal combustion engines with a variable nozzle vane supercharger.

BACKGROUND ART

Some internal combustion engines (hereinafter also referred to as engines) for vehicles have a supercharger (hereinafter also referred to as a turbocharger), which utilizes the energy of exhaust gas. The turbocharger typically includes a turbine wheel which is rotated by the flow of exhaust gas through the engine's exhaust gas path, a compressor impeller which forcedly introduces air in an intake air path into the engine's combustion chamber, and a shaft which connects the turbine wheel and the compressor impeller. In the turbocharger having such a structure, the turbine wheel located in the exhaust gas path is rotated by the energy of exhaust gas, whereby the compressor impeller located in the intake air path is rotated to compress the intake air, which is then forcedly introduced into the combustion chamber of each cylinder.

A variable nozzle vane turbocharger, which can adjust boost pressure caused by the energy of exhaust gas, is becoming a mainstream in-vehicle turbocharger.

The variable nozzle vane turbocharger includes, for example, a variable nozzle vane mechanism (VN mechanism) provided in an exhaust gas flow path in a turbine housing and having a plurality of nozzle vanes (also called as movable vanes) which can change the flow path area of the exhaust gas flow path, an actuator (motor actuator) which displaces (rotates) the nozzle vanes, and the like. By changing the opening degree of the nozzle vanes to change the flow path area (throat area) between adjacent nozzle vanes, the flow rate of exhaust gas introduced toward the turbine wheel is adjusted (see, for example, PTL 1 and 2). Thus, by adjusting the exhaust gas flow rate, the rotational speeds of the turbine wheel and the compressor impeller can be adjusted to regulate the pressure of air introduced into the combustion chamber of the engine.

The increased flexibility of adjustment of the boost pressure caused by the energy of exhaust gas imparts, to the variable nozzle vane turbocharger, advantages such as an improvement in torque response which will contribute to acceleration, an improvement in the flexibility of adaptation to power, fuel efficiency (fuel consumption), emissions, and the like. Note that there is a growing use of the variable nozzle vane turbocharger for gasoline engines in addition to diesel engines.

[Citation List]
[Patent Literature]
[PTL 1] JP 2009-299505 A
[PTL 2] JP 2003-129853 A
[PTL 3] JP 2009-281144 A

DISCLOSURE OF INVENTION

Technical Problems

If the turbocharger has the variable nozzle vane mechanism, then when the flow rate of exhaust gas passing through the nozzle vanes increases, a disturbed flow (wake) of exhaust gas occurs behind (downstream of) the nozzle vanes. A representative disturbance in the exhaust gas flow is the Rankine vortex. The Rankine vortex is generated at the rear ends of the nozzle vanes, and is known to have pressure pulsation having a frequency component which is in proportion to the flow rate of exhaust gas. Specifically, the vortex shedding frequency f of the Rankine vortex satisfies a theoretical equation [f=St*U/D, where St is the Strouhal number (constant), U is the flow rate, and D is the width of the wake]. Therefore, the pressure pulsation caused by the Rankine vortex has a frequency component which is in proportion to the flow rate of exhaust gas passing through the nozzle vanes. If the pressure pulsation frequency is amplified by spatial resonance in spaces in the turbine housing and an exhaust gas pipe (the exhaust gas path between the turbine housing and the catalyst), noise (discharge sound) disadvantageously occurs when exhaust gas is discharged from the exhaust gas outlet through the vehicle exhaust gas pipe.

Here, in order to avoid the aforementioned pressure pulsation problem, the frequency of the spatial resonance in the turbine housing or the catalyst system, which is responsible for the amplification, may be controlled. In this case, however, the flexibility of hardware design is low due to constraints on supercharge efficiency, emissions, layout requirements, and the like, and therefore, it is difficult to reduce the occurrence of the noise. Even if the spatial resonance frequency is modified, the amplification (resonance) of pulsation in the frequency band of the modified spatial resonance cannot be avoided, because the pressure pulsation has a frequency component which is in proportion to the exhaust gas flow rate as described above.

It is also contemplated that a sound absorber may be added to the vehicle exhaust gas pipe. In this case, however, the flexibility of measures against one noise phenomenon is low due to constraints on layout requirements, appearance, cost, and the like. Even if a vehicle itself is modified to take measures against the discharge sound of the vehicle exhaust gas pipe, sounds outside the vehicle remains problematic (particularly, noise occurs during racing (high idling) when the vehicle stops).

For the above reasons, it is necessary to take measures in the engine (turbocharger) upstream from the variable nozzle vane mechanism to reduce the noise caused by the pressure pulsation occurring at the rear ends of the nozzle vanes. To date, however, such a technique has not been established.

The present invention has been made in view of the aforementioned circumstances. An object of the present invention is to provide a control which reduces noise caused by pressure pulsation occurring at the rear ends of nozzle vanes in a control device for an internal combustion engine with a variable nozzle vane mechanism supercharger.

Means for Solving the Problems

A control device for an internal combustion engine with a supercharger according to the present invention includes a throttle valve provided in an intake air path, a supercharger including a compressor impeller provided in the intake air path and a turbine wheel provided in an exhaust gas path, an EGR valve provided in an EGR path connecting the exhaust gas path upstream from the turbine wheel and the intake air path downstream from the compressor impeller and configured to adjust the amount of exhaust gas recirculating from the exhaust gas path to the intake air path, and a catalyst provided in the exhaust gas path downstream from a turbine housing of the supercharger. The supercharger is a variable nozzle vane supercharger including a variable nozzle vane mechanism having a plurality of nozzle vanes provided at an outer circumference of the turbine wheel and configured to adjust a flow of exhaust gas by changing the opening degree of the nozzle vanes.

A characteristic feature of the control device is that the control device includes a flow rate control unit configured to, when the flow rate of exhaust gas passing through the nozzle vanes has reached a flow rate which falls within a spatial resonance region in an exhaust gas passage space between the turbine housing of the supercharger and the catalyst during acceleration or deceleration, adjust one or more of the opening degree of the throttle valve, the opening degree of the EGR valve, and the opening degree of the nozzle vanes to control the flow rate of exhaust gas passing through the nozzle vanes so that the flow rate of exhaust gas passing through the nozzle vanes does not fall within the spatial resonance region.

According to the present invention, the noise caused by the pressure pulsation occurring at the rear ends of the nozzle vanes is reduced by utilizing the fact that the frequency of the pressure pulsation occurring at the rear ends of the nozzle vanes is in proportion to the flow rate of exhaust gas passing through the nozzle vanes (the flow rate at the rear ends of the nozzle vanes). Specifically, during acceleration or deceleration (acceleration or deceleration of the internal combustion engine), when the flow rate of exhaust gas passing through the nozzle vanes (hereinafter also referred to as a VN passage flow rate) has reached a flow rate which falls within the spatial resonance region, one or more of the opening degree of the throttle valve, the opening degree of the EGR valve, and the opening degree of the nozzle vanes is controlled to change (increase or decrease) the VN passage flow rate so that the VN passage flow rate does not fall within the spatial resonance region, whereby the spatial resonance region can be quickly passed. As a result, the time during which the frequency of the pressure pulsation occurring at the rear ends of the nozzle vanes is amplified in the spatial resonance region can be reduced, whereby the noise caused by the pressure pulsation can be reduced. In addition, during acceleration or deceleration, the VN passage flow rate only needs to be changed for a short period of time in which the spatial resonance region is passed. Therefore, the noise caused by the pressure pulsation can be reduced while ensuring a requested boost pressure (air amount).

In a specific configuration of the present invention, the VN passage flow rate may be estimated based on the boost pressure (air amount), the intake gas temperature, the fuel injection amount (burnt gas amount), the opening degree of the throttle valve, the opening degree of the EGR valve, and the opening degree of the nozzle vanes, which are parameters relating to the flow amount of exhaust gas flowing toward the turbine wheel (nozzle vanes) of the turbocharger. When the estimated VN passage flow rate has reached a flow rate which falls within the spatial resonance region, one or more of the opening degree of the throttle valve, the opening degree of the EGR valve, and the opening degree of the nozzle vanes may be adjusted to change the VN passage flow rate so that the VN passage flow rate does not fall within the spatial resonance region. Note that, during deceleration (the accelerator is off), the engine is in a fuel-cut state, and therefore, the fuel injection amount (burnt gas amount) is assumed to be zero.

A specific control of the present invention will be described hereinafter.

Firstly, during acceleration, when the VN passage flow rate has reached a flow rate which falls within the spatial resonance region (e.g., a flow rate vna at point A shown in FIG. 9), the opening degree of the throttle valve, the opening degree of the EGR valve, and the opening degree of the nozzle vanes are controlled so that the VN passage flow rate is higher than that during the normal control (a target boost pressure is ensured). Thus, during acceleration, when the spatial resonance region has been reached, by causing the VN passage flow rate to be higher than that during the normal control the VN passage flow rate can quickly shift to a flow rate (a flow rate vnb at point B shown in FIG. 9) which does not fall within the spatial resonance region, i.e., the spatial resonance region (a zone A-B shown in FIG. 9) can be quickly passed.

In this case, by controlling the opening degree of the nozzle vanes to a closed position after setting the opening degree of the EGR valve to a predetermined value in a closed position, the VN passage flow rate is increased. Specifically, after the opening degree of the EGR valve is set to a value (an opening degree in a closed position) which is as low as possible within the range in which appropriate emissions can be ensured, the opening degree of the nozzle vanes is set to a value in a closed position, taking drivability or the like into consideration, whenever possible, whereby the VN passage flow rate is caused to be higher than that during the normal control. By providing such settings, the spatial resonance region can be quickly passed during acceleration without a reduction in emissions and drivability.

Here, during acceleration, if the opening degree of the EGR valve and the opening degree of the nozzle vanes are set to a closed position as described above, an increased turbo rotational speed may cause an excessive boost pressure. In this regard, while the VN passage flow rate continues to fall within the spatial resonance region, the opening degree of the throttle valve may be adjusted (to a closed position) to limit (prevent) the excessive increase of boost pressure.

In a specific example of the control during acceleration, the control which causes the VN passage flow rate to be higher than that during the normal control (the target boost pressure is ensured) may continue to be performed after the VN passage flow rate has reached a flow rate which falls within the spatial resonance region and until a predetermined time has elapsed, and when the predetermined time has elapsed, the control may return to the normal control.

The predetermined time may be a time required to pass through the spatial resonance region (pass through the zone A-B of a spatial resonance region Ra shown in FIG. 9) when, during acceleration, the VN passage flow rate is higher than that during the normal control. The predetermined time may be set to a value which has been adapted by conducting an experiment/simulation or the like. By providing such a setting, the control can reliably return to the normal control after passage through the spatial resonance region, whereby the noise caused by the pressure pulsation can be reliably reduced.

Thus, the timing of ending the control which increases the VN passage flow rate, i.e., the timing of returning to the normal control after the passage through the spatial resonance region, is managed based on the above predetermined time. Therefore, the opening degree of the EGR valve, the opening degree of the nozzle vanes, and the like can be reset to those during the normal control without determining whether or not the spatial resonance region has been passed.

Next, a specific example of the control during deceleration will be described.

Firstly, during deceleration, when the VN passage flow rate has reached a flow rate which falls within the spatial resonance region (e.g., the flow rate vnb at point B shown in FIG. 9), one or more of the opening degree of the throttle valve, the opening degree of the EGR valve, and the opening degree of the nozzle vanes is controlled so that the VN passage flow rate is lower than that during the normal control (a target boost pressure is ensured). Thus, during deceleration, when the spatial resonance region has been reached, by causing the VN passage flow rate to be lower than that during the normal control the VN passage flow rate can quickly shift to a flow rate (the flow rate vna at point A shown in FIG. 9) which does not fall within the spatial resonance region, i.e., the spatial resonance region (a zone B-A shown in FIG. 9) can be quickly passed.

In this case, by controlling the opening degree of the nozzle vanes to an open position after setting the opening degree of the EGR valve to a predetermined value in an open position, the VN passage flow rate is decreased. Specifically, after the opening degree of the EGR valve is set to a value (an opening degree in an open position) which is as high as possible within the range in which appropriate emissions can be ensured, the opening degree of the nozzle vanes is set to a value in an open position, taking drivability or the like into consideration, whenever possible, whereby the VN passage flow rate is caused to be lower than that during the normal control. By providing such settings, the spatial resonance region can be quickly passed without a reduction in emissions and drivability.

In a specific example of the control during deceleration, the control which causes the VN passage flow rate to be lower than that during the normal control (the target boost pressure is ensured) may continue to be performed after the VN passage flow rate has reached a flow rate which falls within the spatial resonance region and until a predetermined time has elapsed, and when the predetermined time has elapsed, the control may return to the normal control.

The predetermined time may be a time required to pass through the spatial resonance region (pass through the zone B-A of the spatial resonance region Ra shown in FIG. 9) when the VN passage flow rate is lower than that during the normal control. The predetermined time may be set to a value which has been adapted by conducting an experiment/simulation or the like. By providing such a setting, the control can be reliably returned to the normal control after passage through the spatial resonance region, whereby the noise caused by the pressure pulsation can be reliably reduced.

Thus, during deceleration, the timing of ending the control which decreases the VN passage flow rate, i.e., the timing of returning to the normal control after the passage through the spatial resonance region, is managed based on the above predetermined time. Therefore, the opening degree of the EGR valve, the opening degree of the nozzle vanes, and the like can be reset to those during the normal control without determining whether or not the spatial resonance region has been passed.

As another specific means of the present invention, during acceleration or deceleration (acceleration or deceleration of an internal combustion engine), when the frequency of pressure pulsation which is in proportion to the flow rate (VN passage flow rate) of exhaust gas passing through the nozzle vanes has reached a frequency which falls within the spatial resonance region in the exhaust gas passage space between the turbine housing of the supercharger and the catalyst, one or more of the opening degree of the throttle valve, the opening degree of the EGR valve, and the opening degree of the nozzle vanes may be adjusted to control the flow rate of exhaust gas passing through the nozzle vanes so that the pressure pulsation frequency does not fall within the spatial resonance region.

Also in such a control, the spatial resonance region can be quickly passed during acceleration or deceleration. As a result, the time during which the frequency of the pressure pulsation occurring at the rear ends of the nozzle vanes is amplified in the spatial resonance region can be reduced, whereby the noise caused by the pressure pulsation can be reduced. In addition, during acceleration or deceleration, the VN passage flow rate only needs to be changed for a short period of time in which the spatial resonance region is passed. Therefore, the noise caused by the pressure pulsation can be reduced while ensuring a requested boost pressure (air amount).

Here, also in this control, similar to the above control, during acceleration, when the pressure pulsation frequency has reached a frequency which falls within the spatial resonance region, the opening degree of the nozzle vanes is controlled to a closed position after the opening degree of the EGR valve is set to a predetermined value in a closed position, thereby causing the VN passage flow rate to be higher than that during the normal control. Also, during deceleration, when the pressure pulsation frequency has reached a frequency which falls within the spatial resonance region, the opening degree of the nozzle vanes is controlled to an open position after the opening degree of the EGR valve is set to a predetermined value in an open position, thereby causing the VN passage flow rate to be lower than that during the normal control.

Note that, in this control, the control which is performed when the spatial resonance region has been reached during acceleration or deceleration (e.g., the control of the opening degree of the throttle valve, the opening degree of the EGR valve, the opening degree of the nozzle vanes, or the like) can be performed by the various techniques described above.

As another specific means of the present invention, a control device for an internal combustion engine with a supercharger may be provided which includes a throttle valve provided in an intake air path, and a supercharger including a compressor impeller provided in the intake air path and a turbine wheel provided in an exhaust gas path. The supercharger may be a variable nozzle vane supercharger including a variable nozzle vane mechanism having a plurality of nozzle vanes provided at an outer circumference of the turbine wheel and configured to adjust a flow of exhaust gas by changing the opening degree of the nozzle vanes. During acceleration or deceleration (acceleration or deceleration of an internal combustion engine), when the flow rate of exhaust gas passing through the nozzle vanes has reached a flow rate which falls within a spatial resonance region in an exhaust gas passage space between the turbine housing of the supercharger and the catalyst, one or both of the opening degree of the throttle valve and the opening degree of the nozzle vanes may be adjusted to control the flow rate of exhaust gas passing through the nozzle vanes so that the flow rate of exhaust gas passing through the nozzle vanes does not fall within the spatial resonance region.

Also in such a control, the spatial resonance region can be quickly passed during acceleration or deceleration. As a result, the time during which the frequency of the pressure pulsation occurring at the rear ends of the nozzle vanes is amplified in the spatial resonance region can be reduced, whereby the noise caused by the pressure pulsation can be reduced. In addition, during acceleration or deceleration, the VN passage flow rate only needs to be changed for a short period of time in which the spatial resonance region is passed. Therefore, the noise caused by the pressure pulsation can be reduced while ensuring a requested boost pressure (air amount).

Also, as another specific means of the present invention, a control device for an internal combustion engine with a supercharger may be provided which includes a throttle valve provided in an intake air path, and a supercharger including a compressor impeller provided in the intake air path and a turbine wheel provided in an exhaust gas path. The supercharger may be a variable nozzle vane supercharger including a variable nozzle vane mechanism having a plurality of nozzle vanes provided at an outer circumference of the turbine wheel and configured to adjust a flow of exhaust gas by changing the opening degree of the nozzle vanes. During acceleration or deceleration (acceleration or deceleration of an internal combustion engine), when the frequency of pressure pulsation which is in proportion to the flow rate of exhaust gas passing through the nozzle vanes has reached a frequency which falls within a spatial resonance region in an exhaust gas passage space between the turbine housing of the supercharger and the catalyst, one or both of the opening degree of the throttle valve and the opening degree of the nozzle vanes may be adjusted to control the flow rate of exhaust gas passing through the nozzle vanes so that the pressure pulsation frequency does not fall within the spatial resonance region.

Also in such a control, the spatial resonance region can be quickly passed during acceleration or deceleration. As a result, the time during which the frequency of the pressure pulsation occurring at the rear ends of the nozzle vanes is amplified in the spatial resonance region can be reduced, whereby the noise caused by the pressure pulsation can be reduced. In addition, during acceleration or deceleration, the VN passage flow rate only needs to be changed for a short period of time in which the spatial resonance region is passed. Therefore, the noise caused by the pressure pulsation can be reduced while ensuring a requested boost pressure (air amount).

Effects of the Invention

According to the present invention, the noise caused by the pressure pulsation can be reduced by control of the internal combustion engine (supercharger).

BRIEF DESCRIPTION OF DRAWINGS

FIG. 7 is a block diagram showing a configuration of a control system, such as an ECU or the like.

MODE FOR CARRYING OUT THE INVENTION

Embodiments of the present invention will be described hereinafter with reference to the accompanying drawings.
-Engine-
A configuration of an engine (internal combustion engine) to which the present invention is applied will be roughly described with reference to FIG. 1. Note that FIG. 1 shows a configuration of only one cylinder of the engine.

Figure 1:
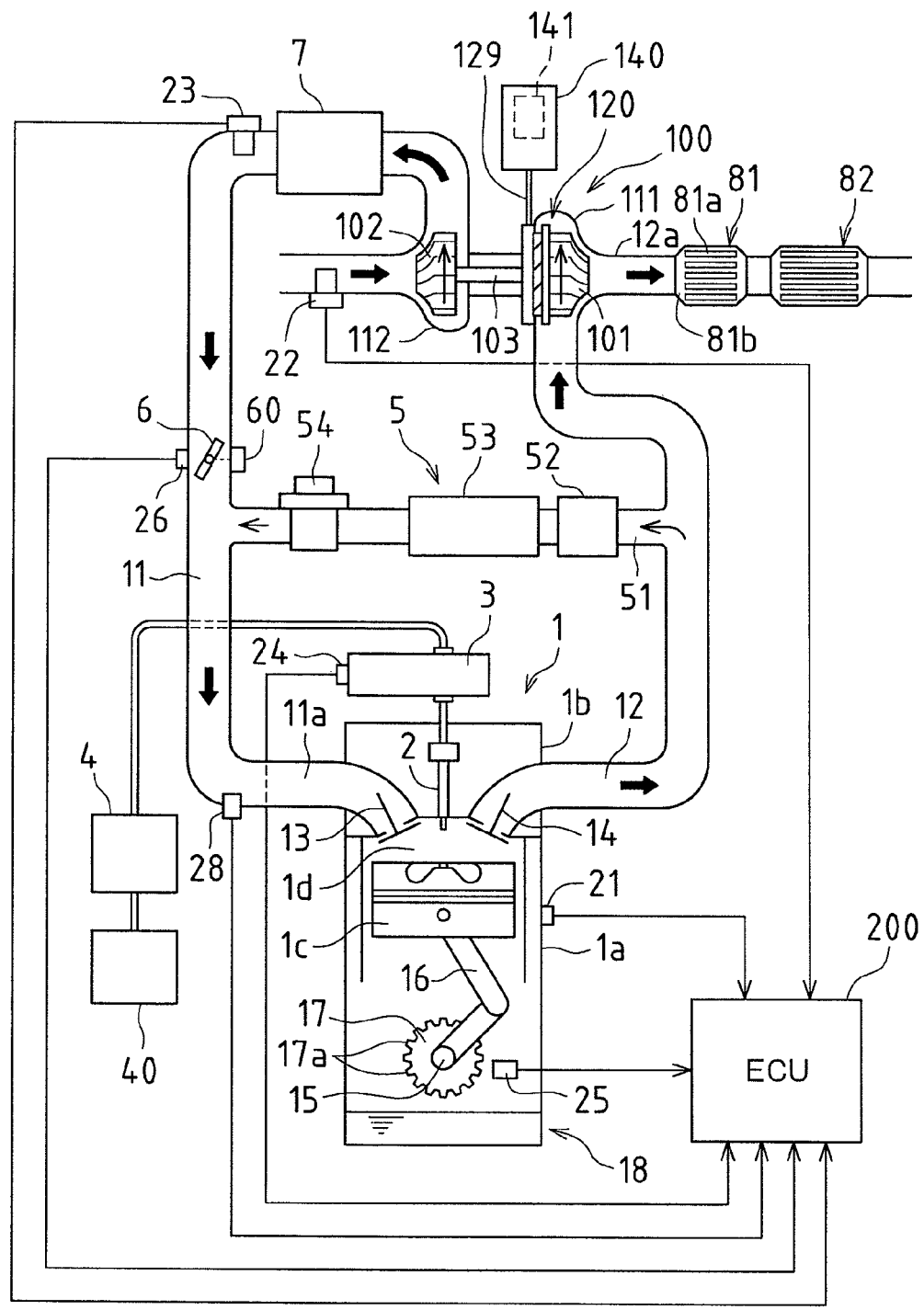
FIG. 1 is a diagram schematically showing a configuration of an example diesel engine to which the present invention is applied.

The engine 1 of FIG. 1 is an in-cylinder direct-injection four-cylinder diesel engine. A piston $1c$ which moves up and down (reciprocates vertically) is provided in a cylinder block $1a$ of each cylinder. The piston $1c$ is connected via a connecting rod 16 to a crankshaft 15. The reciprocating motion of the piston $1c$ is converted into rotation of the crankshaft 15 by the connecting rod 16. The crankshaft 15 of the engine 1 is connected to a transmission (not shown) so that the power of the engine 1 is transmitted via the transmission to a drive wheel (not shown) of the vehicle.

A signal rotor 17 is attached to the crankshaft 15. A plurality of protrusions (teeth) $17a, \ldots, 17a$ are equiangularly spaced and provided on an outer circumferential surface of the signal rotor 17. An engine rotational speed sensor (crankshaft position sensor) 25 is provided laterally to and in the vicinity of the signal rotor 17. The engine rotational speed sensor 25 is, for example, an electromagnetic pickup. When the crankshaft 15 is rotated, the engine rotational speed sensor 25 generates a pulsed signal (output pulses) corresponding to the protrusions $17a$ of the signal rotor 17.

The cylinder block $1a$ of the engine 1 includes a water temperature sensor 21 which detects the temperature of engine cooling water. A cylinder head $1b$ is provided at an upper end of the cylinder block $1a$. A combustion chamber $1d$ is formed between the cylinder head $1b$ and the piston $1c$.

An oil pan 18 which stores engine oil is provided below the cylinder block $1a$ of the engine 1. The engine oil stored in the oil pan 18, when the engine 1 is operated, is drawn out through an oil strainer which removes foreign matter, by an oil pump. After being cleaned through an oil filter, the engine oil is supplied to the piston $1c$, the crankshaft 15, the connecting rod 16, and the like and used to, for example, lubricate and cool the parts.

The cylinder head $1b$ of the engine 1 includes an injector 2 for directly injecting fuel into the combustion chamber $1d$ of the engine 1. A common rail (accumulator) 3 is connected to the injector 2. When the injector 2 is open, fuel in the common rail 3 is injected from the injector 2 into the combustion chamber $1d$.

The common rail 3 has a rail pressure sensor 24 for detecting the pressure (rail pressure) of high pressure fuel in the common rail 3. A supply pump 4 (fuel pump) is connected to the common rail 3.

The supply pump 4 is driven by the torque of the crankshaft 15 of the engine 1. The driven supply pump 4 supplies fuel from the fuel tank 40 to the common rail 3. The fuel is injected into the combustion chamber 1d of each cylinder of the engine 1 by opening the valve of the injector 2 with predetermined timing. The injected fuel is burnt in the combustion chamber 1d to generate exhaust gas, which is discharged. Note that the valve opening timing (injection period) of the injector 2 is controlled by an ECU (Electronic Control Unit) 200.

An intake air path 11 and an exhaust gas path 12 are connected to the combustion chamber 1d of the engine 1. An intake valve 13 is provided between the intake air path 11 and the combustion chamber 1d. By opening and closing the intake valve 13, the flow between the intake air path 11 and the combustion chamber 1d is passed and blocked.

An exhaust valve 14 is provided between the exhaust gas path 12 and the combustion chamber 1d. By opening and closing the exhaust valve 14, the flow between the exhaust gas path 12 and the combustion chamber 1d is passed and blocked. The intake valve 13 and the exhaust valve 14 are opened and closed by the rotation of an intake camshaft and an exhaust camshaft, respectively, to which the rotation of the crankshaft 15 is transmitted.

The intake air path 11 includes an air cleaner (not shown), an air flow meter 22 which detects the amount of intake air (the amount of new air), a compressor impeller 102 of a turbocharger 100 described below, an intercooler 7 for forcedly cooling intake air whose temperature is increased due to compression by the turbocharger 100, an intake air temperature sensor 23, a throttle valve 6, an intake manifold pressure sensor (boost pressure sensor) 28 which detects pressure (boost pressure) in an intake manifold 11a, and the like.

The throttle valve 6 is provided in the intake air path 11 downstream from the intercooler 7 (the compressor impeller 102 of the turbocharger 100) (downstream in the flow of intake air). The opening degree of the throttle valve 6, which is an electronically-controlled valve, is adjusted by a throttle motor 60. The opening degree (throttle opening degree) of the throttle valve 6 is detected by a throttle opening degree sensor 26. The throttle valve 6 of this example can electronically control the throttle opening degree independently of a driver's accelerator pedal operation.

An upstream S/C catalyst (start catalyst) 81 and a downstream U/F catalyst (underfloor catalyst) 82 are provided in the exhaust gas path 12. The S/C catalyst 81 is, for example, a three-way catalyst which is used to convert hydrocarbon (HC), carbon monoxide (CO), nitrogen oxides (NOx), and the like into non-toxic substances. The U/F catalyst 82 is, for example, a NOx catalyst (e.g., an NSR (NOx Storage Reduction) catalyst) having a function of storing NOx from exhaust gas and reducing the stored NOx.

-Turbocharger-

The engine 1 includes the turbocharger (supercharger) 100 which compresses intake air using the pressure of exhaust gas.

Figure 2:
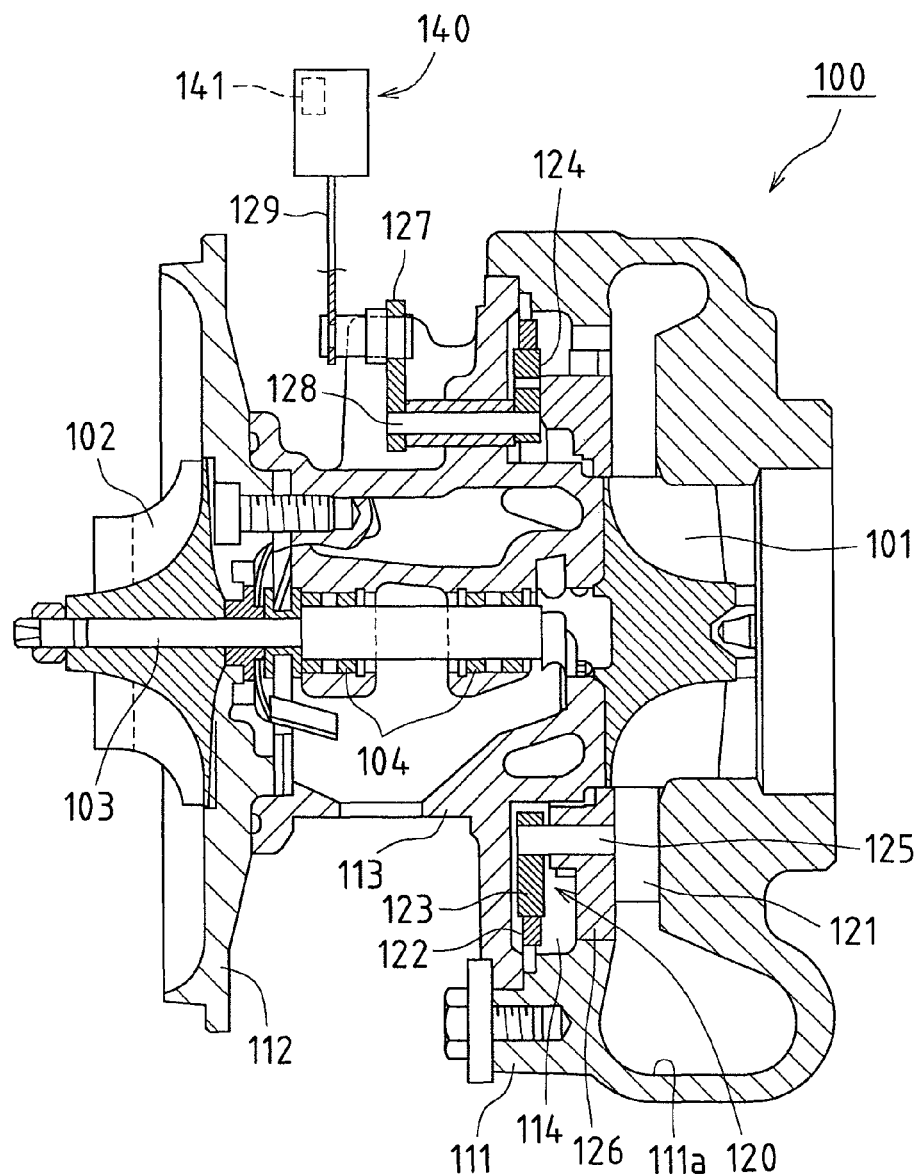
FIG. 2 is a vertical cross-sectional view showing an example turbocharger provided to the engine.

As shown in FIGS. 1 and 2, the turbocharger 100 includes a turbine wheel 101 provided in the exhaust gas path 12, the compressor impeller 102 provided in the intake air path 11, a connecting shaft 103 which connects the turbine wheel 101 and the compressor impeller 102 together, and the like. The turbine wheel 101 provided in the exhaust gas path 12 is rotated by the energy of exhaust gas, whereby the compressor impeller 102 provided in the intake air path 11 is rotated. Intake air is compressed by the rotation of the compressor impeller 102, and the compressed air is forcedly introduced into the combustion chamber of each cylinder of the engine 1.

Note that the turbine wheel 101 is housed in a turbine housing 111, and the compressor impeller 102 is housed in a compressor housing 112. Floating bearings 104 and 104 which support the connecting shaft 103 are housed in a center housing 113. The turbine housing 111 and the compressor housing 112 are attached to opposite sides of the center housing 113.

The turbocharger 100 of this example is a variable nozzle turbocharger (VNT). A variable nozzle vane mechanism 120 is provided to the turbine wheel 101. By adjusting the opening degree (hereinafter also referred to as a VN opening degree) of the variable nozzle vane mechanism 120, the boost pressure of the engine 1 can be adjusted. Details of the variable nozzle vane mechanism 120 will be described below.

-EGR Device-

The engine 1 also includes an EGR device 5. The EGR device 5 introduces a portion of exhaust gas into intake air to reduce combustion temperature in the combustion chamber 1d, thereby reducing the amount of NOx.

As shown in FIG. 1, the EGR device 5 includes an EGR path 51 through which the exhaust gas path 12 upstream from the turbine wheel 101 of the turbocharger 100 (upstream in the flow of exhaust gas) and the intake air path 11 downstream from the intercooler 7 (the compressor impeller 102 of the turbocharger 100) (downstream in the flow of intake air) are in communication with each other, an EGR catalyst (e.g., an oxidation catalyst) 52 provided in the EGR path 51, an EGR cooler 53, an EGR valve 54, and the like. In the EGR device 5 thus configured, an EGR rate [the EGR amount/(the EGR amount+the intake air amount (new air amount)) (%)] can be changed by adjusting the opening degree of the EGR valve 54, whereby the EGR amount (the amount of exhaust gas recirculation) introduced from the exhaust gas path 12 into the intake air path 11 can be adjusted.

Note that the EGR device 5 may have an EGR bypass path which bypasses the EGR cooler 53, and an EGR bypass switching valve.

-Variable Nozzle Vane Mechanism-

Next, the variable nozzle vane mechanism 120 of the turbocharger 100 will be described with reference to FIGS. 1-6.

In the variable nozzle vane mechanism 120 of this example, a link chamber 114 is formed between the turbine housing 111 and center housing 113 of the turbocharger 100. The variable nozzle vane mechanism 120 includes an annular unison ring 122, a plurality of open/close arms 123, . . . , 123 which are located inside the unison ring 122 and a portion of which are engaged with the unison ring 122, a main arm 124 for driving the open/close arms 123, vane shafts 125 connected to the respective open/close arms 123 and for driving respective nozzle vanes 121, and a nozzle plate 126 which holds the vane shafts 125.

The variable nozzle vane mechanism 120 adjusts the rotation angles (rotational attitudes) of the plurality of (e.g., 12) nozzle vanes 121, . . . , 121, which are equally spaced. The nozzle vanes 121, . . . , 121 are provided along the outer circumference of the turbine wheel 101. Each nozzle vane 121 is provided on the nozzle plate 126 and can be rotated by a predetermined angle about the vane shaft 125.

In the variable nozzle vane mechanism 120, a drive link 127 connected to the main arm 124 is rotated by a predetermined angle, whereby the torque of the drive link 127 is transmitted via the main arm 124, the unison ring 122, and the open/close arms 123 to the nozzle vanes 121, so that the nozzle vanes 121 are rotated in association with each other.

Specifically, the drive link 127 can be rotated about a drive shaft 128. The drive shaft 128 is connected to the drive link 127 and the main arm 124 so that the drive shaft 128 is rotated along with the drive link 127 and the main arm 124. When the drive shaft 128 is rotated by the rotation of the drive link 127, the torque of the drive shaft 128 is transmitted to the main arm 124. An inner circumferential end portion of the main arm 124 is fixed to the drive shaft 128. An outer circumferential end portion of the main arm 124 is engaged with the unison ring 122. When the main arm 124 is rotated about the drive shaft 128, the torque of the main arm 124 is transmitted to the unison ring 122.

An outer circumferential end portion of each open/close arm 123 is fitted into an inner circumferential surface of the unison ring 122. When the unison ring 122 is rotated, the torque of the unison ring 122 is transmitted to the open/close arms 123. Specifically, the unison ring 122 is allowed to slide in a circumferential direction relative to the nozzle plate 126. Outer circumferential end portions of the main arm 124 and the open/close arms 123 are fitted into a plurality of concave portions 122a provided in an inner circumferential edge of the unison ring 122, and the torque of the unison ring 122 is transmitted to the open/close arms 123.

The nozzle plate 126 is fixed to the turbine housing 111. Pins 126a (see FIGS. 3 and 5) are inserted into the nozzle plate 126. Rollers 126b are fitted into the pins 126a. The rollers 126b guide the inner circumferential surface of the unison ring 122. As a result, the unison ring 122 is held by the rollers 126b so that the unison ring 122 can be rotated in a predetermined direction.

Each open/close arm 123 can be rotated about the corresponding vane shaft 125. Each vane shaft 125 is rotatably supported by the nozzle plate 126. Each vane shaft 125 connects the corresponding open/close arm 123 and nozzle vane 121 so that the open/close arm 123 and the nozzle vane 121 can be rotated together. When each open/close arm 123 is rotated by the rotation of the unison ring 122, the rotation of the open/close arm 123 is transmitted to the corresponding vane shaft 125. As a result, each nozzle vane 121 is rotated along with the corresponding vane shaft 125 and open/close arm 123.

A turbine housing swirl chamber 111a is provided in the turbine housing 111 which houses the turbine wheel 101. Exhaust gas is supplied to the turbine housing swirl chamber 111a. The turbine wheel 101 is rotated by the flow of the exhaust gas. In this case, as described above, the rotational position of each nozzle vane 121 is adjusted to set the rotation angle to a predetermined value, whereby the flow amount and flow rate of exhaust gas passing from the turbine housing swirl chamber 111a to the turbine wheel 101 can be adjusted. As a result, turbocharger performance can be adjusted. For example, if the rotational position (displacement) of each nozzle vane 121 is adjusted so that the flow path area (throat area) between each nozzle vane 121 is reduced when the engine 1 is operated at low rotational speed, the exhaust gas flow rate is increased, so that a high boost pressure can be obtained at low engine speed.

The drive link 127 of the variable nozzle vane mechanism 120 is connected to a rod 129. The rod 129 is a bar-shaped member and is connected to a VN actuator 140. The VN actuator 140 includes an electric motor (DC motor) 141, and a conversion mechanism (e.g., a gear mechanism (not shown) having a worm gear and a worm wheel engaging with the worm gear) which converts the rotation of the electric motor 141 into linear motion and transfers the linear motion to the rod 129.

The VN actuator 140 is driven and controlled by the ECU 200. For example, the ECU 200 controls energization of the electric motor 141 based on, for example, a nozzle vane opening degree requested depending on the operating state of the engine. Note that an in-vehicle battery (not shown) supplies power to the electric motor 141.

When the electric motor 141 is rotated by the energization control (rotational drive) of the electric motor 141, the torque of the electric motor 141 is transmitted via the rotation mechanism to the rod 129. The drive link 127 is rotated by the movement (forth and back) of the rod 129, so that each nozzle vane 121 is rotated (displaced).

Figure 3:
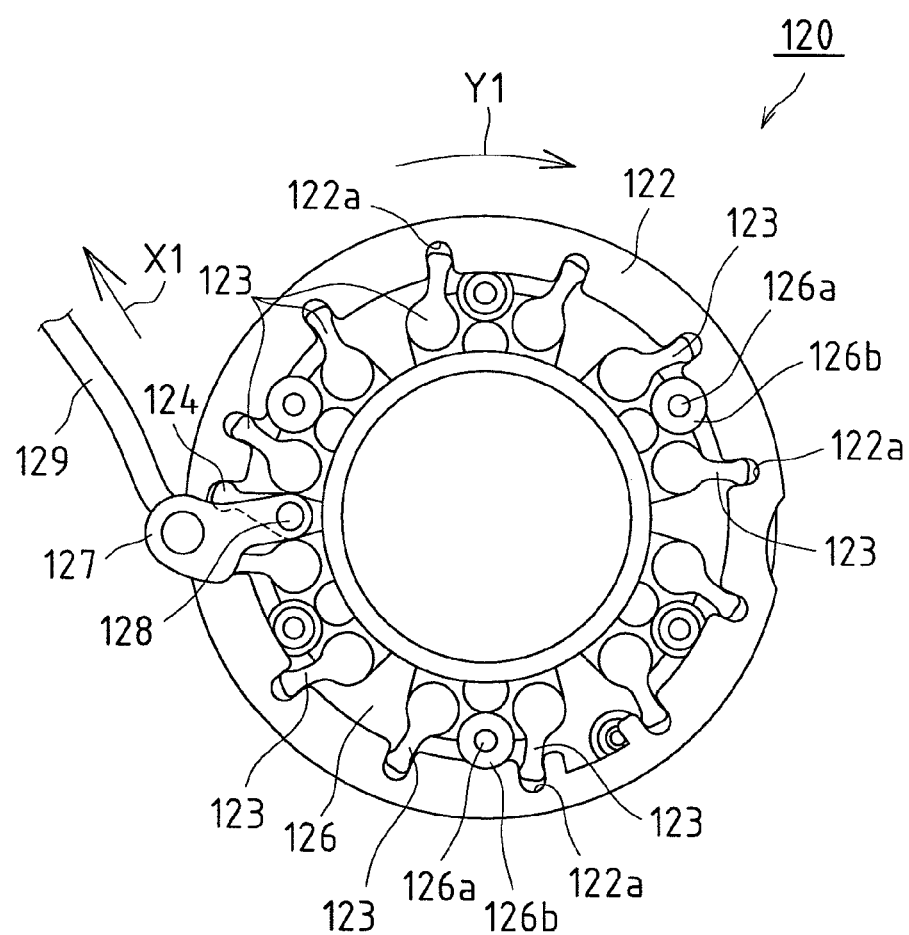
FIG. 3 is a diagram of a variable nozzle vane mechanism as viewed from the outside of the turbocharger, where nozzle vanes are in an open position.
Figure 4:
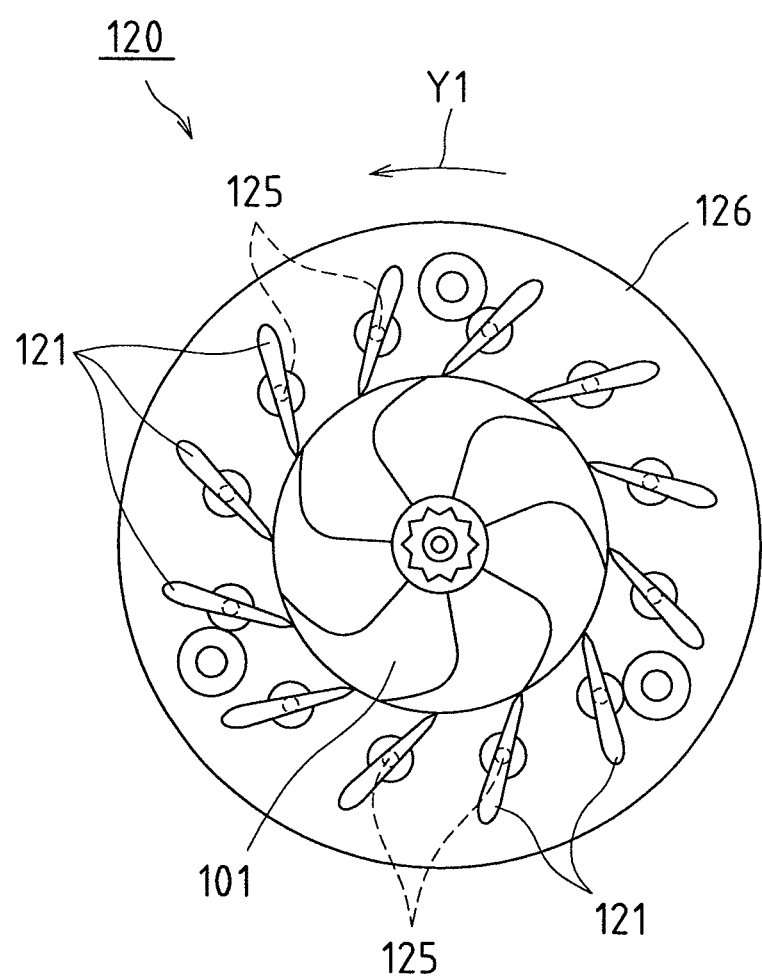
FIG. 4 is a diagram of the variable nozzle vane mechanism as viewed from the inside of the turbocharger, where the nozzle vanes are in an open position.

Specifically, as shown in FIG. 3, when the rod 129 is drawn (retracted) in a direction indicated by an arrow X1, the unison ring 122 is rotated in a direction indicated by an arrow Y1. As a result, as shown in FIG. 4, each nozzle vane 121 is rotated about the vane shaft 125 in an anticlockwise direction (Y1 direction), so that the nozzle vane opening degree (VN opening degree) is set to be high.

Figure 5:
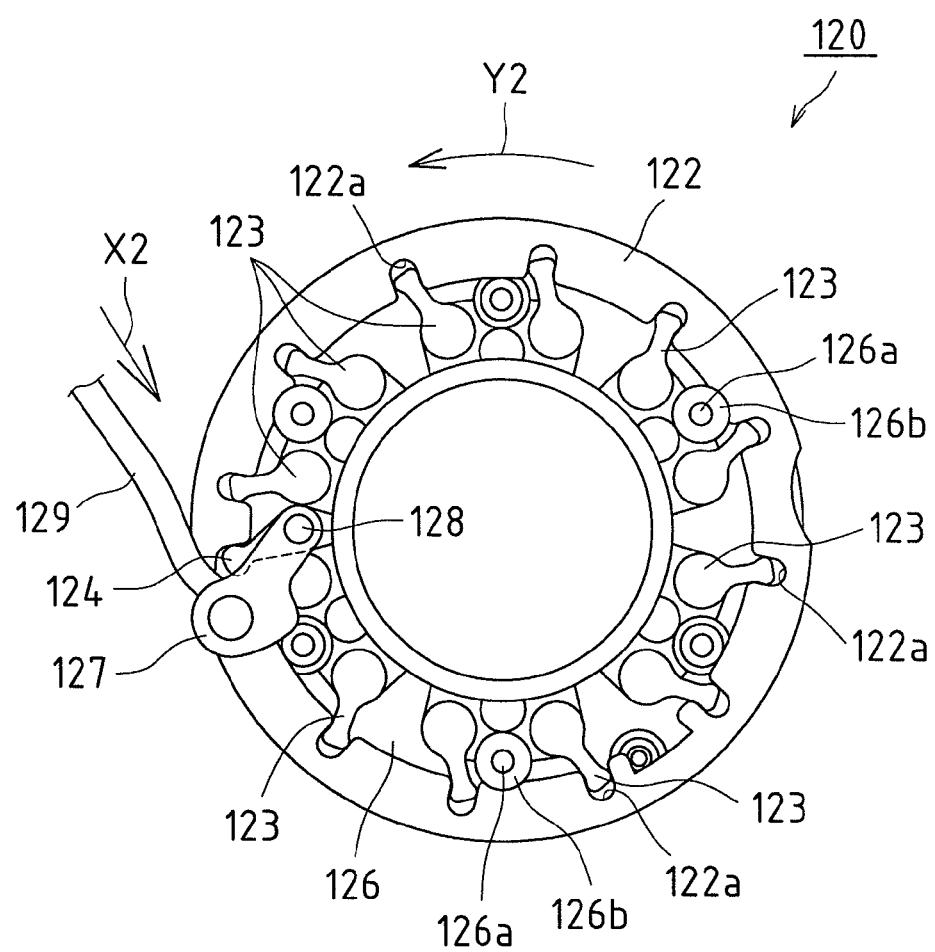
FIG. 5 is a diagram of the variable nozzle vane mechanism as viewed from the outside of the turbocharger, where the nozzle vanes are in a closed position.
Figure 6:
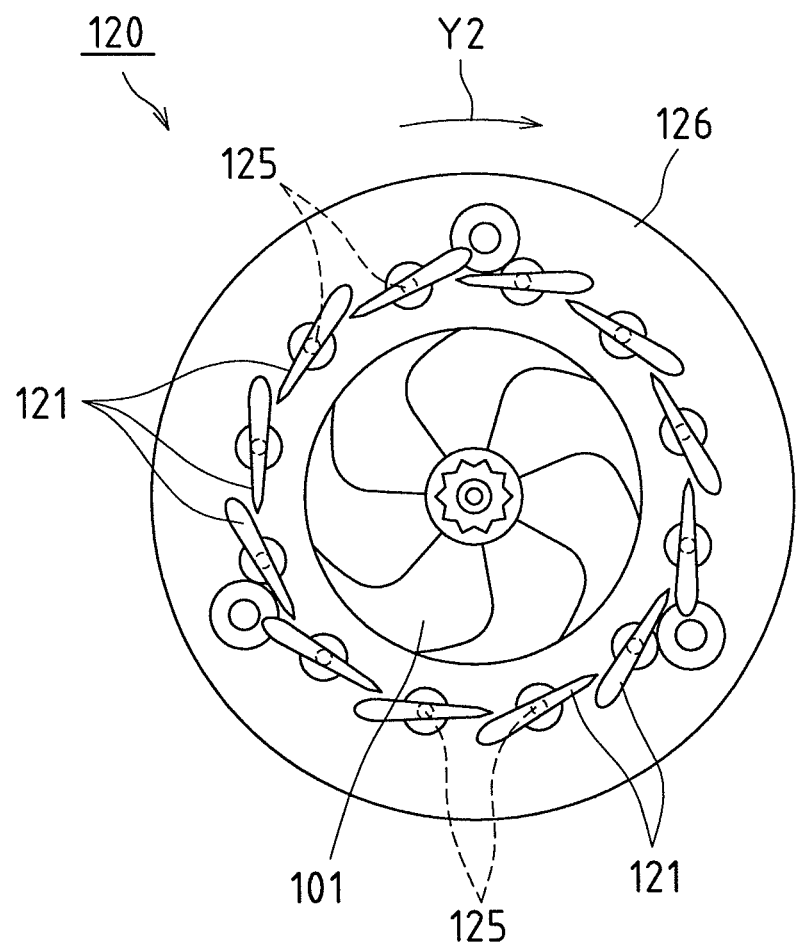
FIG. 6 is a diagram of the variable nozzle vane mechanism as viewed from the inside of the turbocharger, where the nozzle vanes are in a closed position.

On the other hand, as shown in FIG. 5, when the rod 129 is pushed (forward) in a direction indicated by an arrow X2, the unison ring 122 is rotated in a direction indicated by an arrow Y2. As a result, as shown in FIG. 6, each nozzle vane 121 is rotated about the vane shaft 125 in a clockwise direction (Y2 direction), so that the nozzle vane opening degree (VN opening degree) is set to be low.

The above parts, such as the engine 1, the VN actuator 140 (electric motor 141) of the turbocharger 100, the throttle motor 60 which opens and closes the throttle valve 6, the EGR valve 54, and the like, are controlled by the ECU 200.

-ECU-

Figure 7:
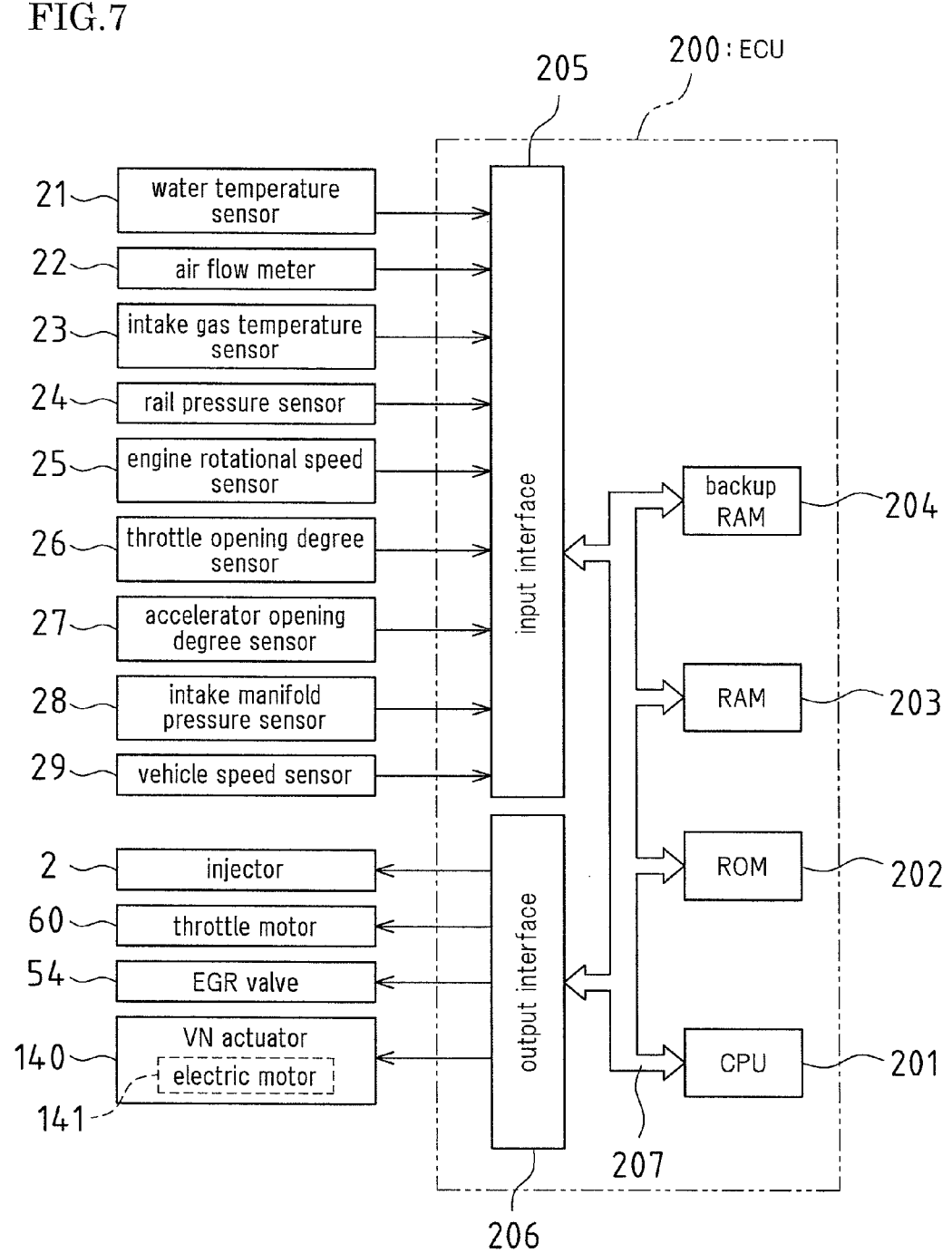

As shown in FIG. 7, the ECU 200 includes a CPU 201, a ROM 202, a RAM 203, a backup RAM 204, and the like.

The ROM 202 stores various control programs, maps which are referenced when the control programs are executed, and the like. The CPU 201 executes various calculation processes based on the control programs and maps stored in the ROM 202. The RAM 203 is a memory which temporarily stores results of calculation by the CPU 201, data input from sensors, and the like. The backup RAM 204 is a non-volatile memory which stores, for example, data which should be saved when the engine 1 is stopped.

The CPU 201, the ROM 202, the RAM 203, and the backup RAM 204 are connected to each other via a bus 207, and are also connected to an input interface 205 and an output interface 206.

Connected to the input interface 205 are the water temperature sensor 21, the air flow meter 22, the intake air temperature sensor 23, the rail pressure sensor 24, the engine rotational speed sensor 25, the throttle opening degree sensor 26 which detects the opening degree of the throttle valve 6, an accelerator opening degree sensor 27 which detects the accelerator pedal position (accelerator opening degree), the intake manifold pressure sensor (boost pressure sensor) 28, a vehicle speed sensor 29, and the like.

Connected to the output interface 206 are the injector 2, the throttle motor 60 for the throttle valve 6, the EGR valve 54, the VN actuator 140 (the electric motor 141) which adjusts the opening degree of the variable nozzle vane mechanism 120 of the turbocharger 100, and the like.

The ECU 200 executes various controls of the engine 1 based on output signals of the above sensors, including a control of the opening degree of the throttle valve 6 of the engine 1, a control of an fuel injection amount and a period (a control of opening and closing of the injector 2), a control of the EGR, and the like. The ECU 200 also executes a "control of a VN passage flow rate" described below.

The above programs executed by the ECU 200 operate a control device for the engine (internal combustion engine) with a supercharger of the present invention.

-Control Of VN Passage Flow Rate-

Firstly, the flow rate (VN passage flow rate) of exhaust gas passing through the nozzle vanes 121 will be described.

Figure 8:
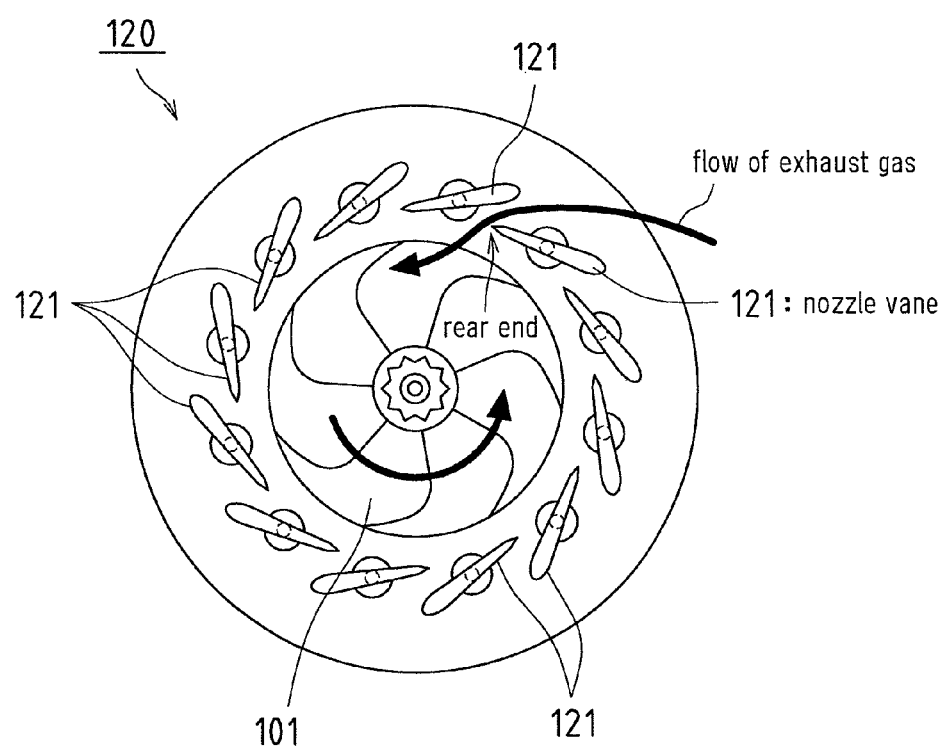
FIG. 8 is a diagram schematically showing a flow of exhaust gas passing through the nozzle vanes.

When the variable nozzle vane mechanism 120 is provided in the turbocharger 100, as shown in FIG. 8 exhaust gas passes through the nozzle vanes 121 to flow toward the turbine wheel 101. As described above, when the flow rate of exhaust gas passing through the nozzle vanes 121 is high, a disturbed flow (wake) of the exhaust gas occurs behind (downstream of) the nozzle vanes 121. A representative disturbance in the exhaust gas flow is the Rankine vortex.

The Rankine vortex is generated at rear ends of the nozzle vanes, and is known to have pressure pulsation having a frequency component which is in proportion to the flow rate of exhaust gas. Specifically, the vortex shedding frequency f of the Rankine vortex satisfies a theoretical equation [f=St*U/D, where St is the Strouhal number (constant), U is the flow rate, and D is the width of the wake]. The pressure pulsation caused by the Rankine vortex has a frequency component which is in proportion to the flow rate of exhaust gas passing through the nozzle vanes 121 (the flow rate at the rear ends of the nozzle vanes). If the pressure pulsation frequency is amplified by spatial resonance in spaces in the turbine housing 111 and an exhaust gas pipe 12a (the exhaust gas path between the turbine housing and the catalyst), noise (discharge sound) disadvantageously occurs when exhaust gas is discharged from the exhaust gas outlet through the vehicle exhaust gas pipe.

Note that the present inventor has confirmed from experiments and simulations that the frequency of the pressure pulsation occurring at the rear end of the nozzle vane 121 is in proportion to the VN passage flow rate.

Specifically, in the turbocharger (VNT) 100 including the variable nozzle vane mechanism 120 of FIGS. 2-6, assuming that the turbo rotational speed is the same (the amount of gas flow to the turbine wheel 101 is the same), the frequency of pressure pulsation occurring at the rear ends of the nozzle vanes 121 was investigated (measured) for [sample S1: the VN opening degree was set to a predetermined opening degree value] and [sample S2: the VN opening degree was changed to a value different from that of [sample S1] to reduce the flow path area (throat area) between each nozzle vane by a factor of 2 (the VN passage flow rate was twice as high as that of [sample S1])]. As a result, the present inventor has confirmed that the frequency of [sample S2] was almost twice as high as that of [sample S1], i.e., the pressure pulsation frequency varied in proportion to the flow rate (at the rear ends of the nozzle vanes) of exhaust gas passing through the nozzle vanes.

In this example, in view of the above problems, the noise caused by the pressure pulsation occurring at the rear ends of the nozzle vanes 121 is reduced by utilizing the fact that the frequency of the pressure pulsation occurring at the rear ends of the nozzle vanes is in proportion to the VN passage flow rate. Specifically, during acceleration or deceleration, when the VN passage flow rate has reached a flow rate which falls within a spatial resonance region (see FIG. 9) in an exhaust gas passage space between the turbine housing 111 and the S/C catalyst 81, the opening degree of the throttle valve 6 (hereinafter also referred to as a throttle opening degree), the opening degree of the EGR valve 54 (hereinafter also referred to as an EGR valve opening degree), and the VN opening degree are adjusted to control the VN passage flow rate so that the VN passage flow rate does not fall within the spatial resonance region. This is a feature of the present invention.

A specific example of the VN passage flow rate control will be described.

<Spatial Resonance Region>

The spatial resonance region used for the VN passage flow rate control of this example will be described.

Figure 9:
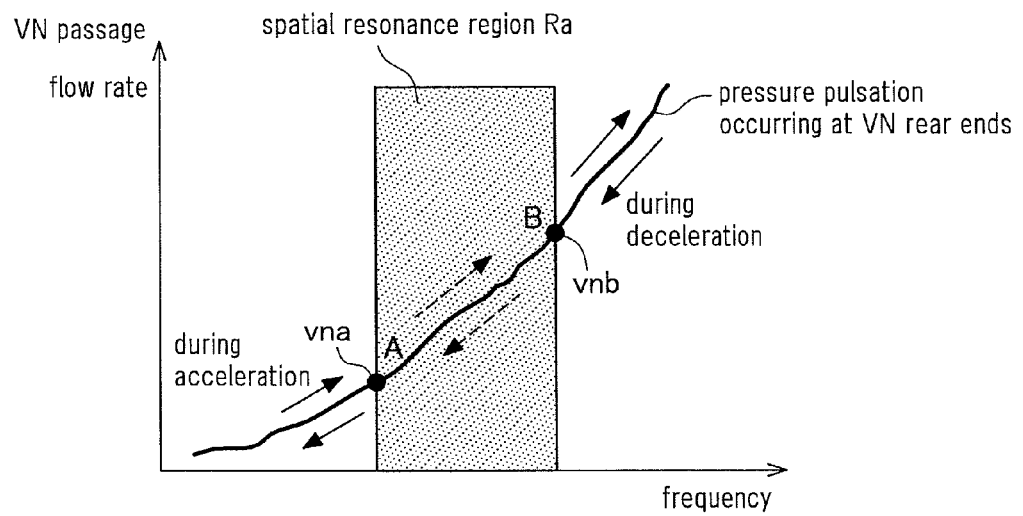
FIG. 9 is a diagram schematically showing pressure pulsation occurring at rear ends of the nozzle vanes, and a spatial resonance region.

Initially, for the target engine 1, CAE (Computer Aided Engineering) is used to specify a spatial shape of the inside of the turbine housing 111 of the turbocharger 100 and a spatial shape of the exhaust gas pipe 12a between the outlet of the turbine housing 111 and the S/C catalyst 81 (including a portion of a space in a casing 81b of the S/C catalyst 81 (a space between the inlet of the casing 81b and a catalyst body 81a), see FIG. 1), thereby evaluating the spatial resonance of [the turbine housing to the catalyst] to obtain a resonance frequency. Thereafter, based on the result, a spatial resonance region Ra shown in FIG. 9 is specified. Here, the frequency band (A-B section) of the spatial resonance region Ra is set to a range (e.g., 600 Hz to 1 kHz) which is empirically adapted, taking into consideration a frequency region which is perceived as noise when the frequency of pressure pulsation occurring at the rear ends of the nozzle vanes 121 is amplified by spatial resonance.

Thereafter, a flow rate value (flow rate vna at point A) at a lower limit (lower frequency) of the spatial resonance region Ra thus specified and a flow rate value (flow rate vnb at point B) at an upper limit (higher frequency) of the spatial resonance region Ra are obtained. Specifically, the flow rate vna at point A is calculated from the theoretical equation of the Rankine vortex [f=St*U/D, where St is the Strouhal number (constant), U is the flow rate, and D is the width of the wake], using the lower limit frequency (e.g., 600 Hz) of the spatial resonance region Ra. Similarly, the flow rate vnb at point B is calculated from the theoretical equation of the Rankine vortex using the upper limit frequency (e.g., 1 kHz) of the spatial resonance region Ra. The flow rate vna at point A and the flow rate vnb at point B are stored in the ROM 202 of the ECU 200.

Note that the spatial resonance region Ra may be specified by obtaining the frequency of the spatial resonance of [the turbine housing to the catalyst] by, for example, conducting an experiment using an actual engine.

<VN Passage Flow Rate Control During Acceleration>

Figure 10:
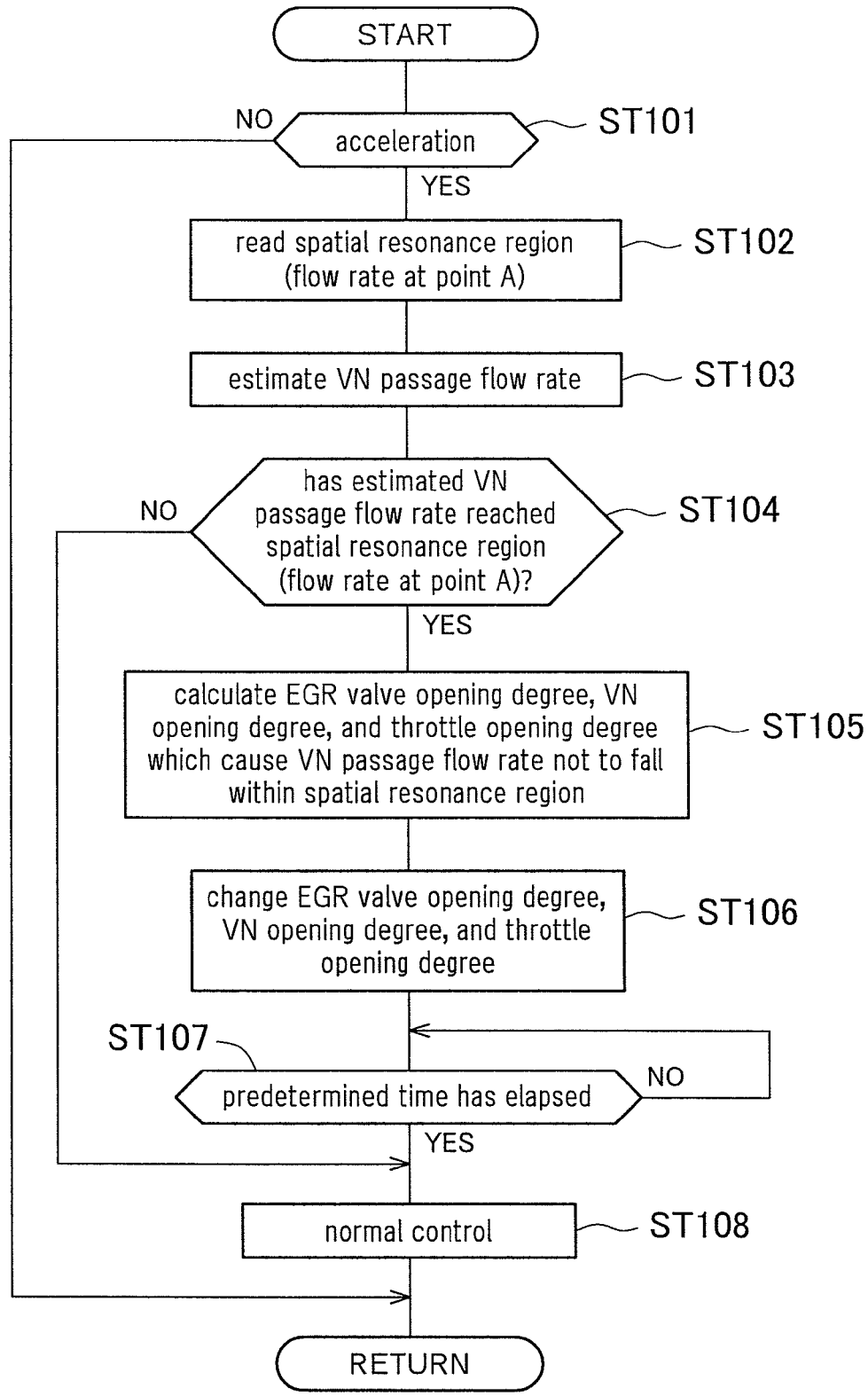
FIG. 10 is a flowchart showing an example VN passage flow rate control during acceleration.

Next, the VN passage flow rate control during acceleration will be described with reference to a flowchart shown in FIG. 10. A control routine of FIG. 10 is repeatedly executed at predetermined intervals (e.g., every several milliseconds) in the ECU 200.

Initially, in step ST101, it is determined whether or not the engine 1 is in an acceleration mode. If the determination result in step ST101 is negative (NO), the routine proceeds to RETURN. If the determination result in step ST101 is positive (YES) (acceleration mode), the routine proceeds to step ST102.

Note that the determination of whether or not the engine 1 is in the acceleration mode may be performed as follows. For example, when the vehicle is traveling, then if the accelerator pedal is pressed, so that the accelerator opening degree detected by the accelerator opening degree sensor 27 is higher than or equal to a predetermined value (or if a change rate (increase rate) of the accelerator opening degree is higher than or equal to a predetermined value), it may be determined that the engine 1 is in the acceleration mode.

In step ST102, the flow rate vna (flow rate at point A in FIG. 9) at the lower limit of the spatial resonance region Ra is read.

Next, in step ST103, the VN passage flow rate is estimated. Specifically, the VN passage flow rate is estimated using an estimation map which is previously adapted by conducting an experiment/simulation or the like based on the boost pressure (air amount), the intake gas temperature, the fuel injection amount (burnt gas amount), the throttle opening degree, the EGR valve opening degree, and the VN opening degree, which are parameters relating to the flow amount of exhaust gas flowing toward the turbine wheel 101 (nozzle vanes 121) of the turbocharger 100. Here, of the parameters used for the estimation of the VN passage flow rate, the boost pressure and the intake gas temperature are calculated from the output signals of the intake manifold pressure sensor (boost pressure sensor) 28 and the intake air temperature sensor 23, respectively. The fuel injection amount, the throttle opening degree, the EGR valve opening degree, and the VN opening degree are obtained from command values (requested values).

The process of estimating the VN passage flow rate in step ST103 is repeatedly executed at predetermined intervals (e.g., every several milliseconds) until the determination result in step ST104 is positive (YES). In other words, the estimated value of the VN passage flow rate is successively updated.

Next, in step ST104, it is determined whether or not the VN passage flow rate estimated in step ST103 has reached the flow rate vna (flow rate at point A in FIG. 9) at the lower limit of the spatial resonance region Ra. If the determination result is negative (NO), a normal control is continued (step ST108). Here, the normal control is to ensure a target boost pressure (air amount). For example, the EGR valve opening degree and the VN opening degree are adjusted by referencing a map (map for the normal control) in which fuel efficiency, emissions, and the like are taken into consideration, based on the current operating state of the engine 1. Note that the throttle opening degree is set to a predetermined opening degree (e.g., "full throttle") after the engine 1 is warmed up.

Thereafter, when the determination result in step ST104 is positive (YES), the EGR valve opening degree, the VN opening degree, and the throttle opening degree with which the VN passage flow rate does not fall within the spatial resonance region Ra are calculated (step ST105). A specific example of such values will be described.

Figure 12:
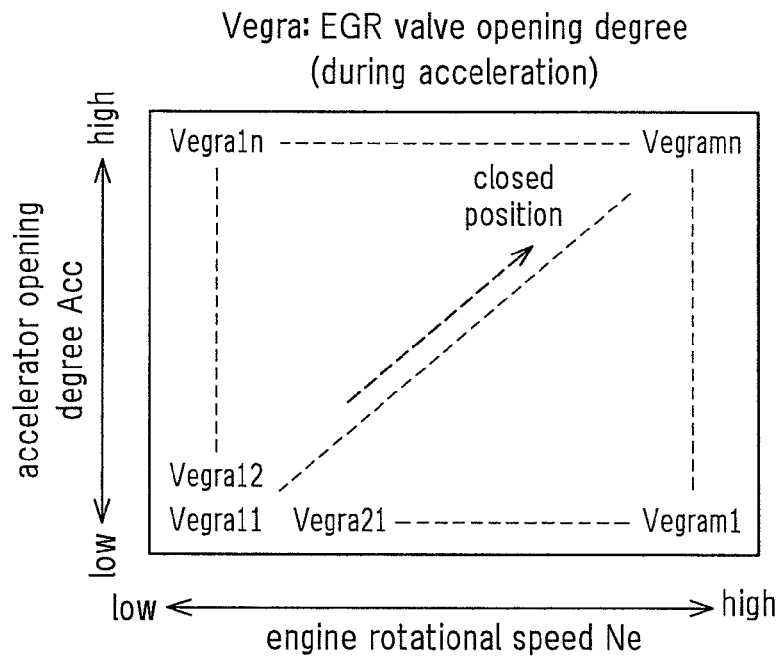
FIG. 12 is a diagram showing an example map for calculation of an EGR valve opening degree (during acceleration).

Firstly, the EGR valve opening degree is calculated using a map shown in FIG. 12. The EGR valve opening degree map of FIG. 12 is produced by mapping values (EGR valve opening degrees: Vegras) which have been adapted by conducting an experiment/simulation or the like, taking emissions and the like into consideration, using the engine rotational speed Ne and the accelerator opening degree Acc as parameters. The EGR valve opening degree map of FIG. 12 is stored in the ROM 202 of the ECU 200. Each value (Vegra) in the map of FIG. 12 is located in a more closed position than in the map during the normal control, and is set to a value which is as low as possible within the range in which appropriate emissions can be ensured.

After the EGR valve opening degree (a predetermined value in a closed position) has been determined by the above calculation, the VN opening degree is set to a value in a closed position, taking drivability or the like into consideration, whenever possible. Similar to the above calculation of the EGR valve opening degree, the VN opening degree may be calculated using a VN opening degree map where the engine rotational speed Ne and the accelerator opening degree Acc are parameters.

The throttle opening degree may be set to the same value that is used during the normal control (e.g., "full throttle"). As described above, the EGR valve opening degree and the VN opening degree are both set to a closed position. Therefore, considering that an increased turbo rotational speed may cause an excessive boost pressure, the throttle opening degree may be set to a value (an opening degree in a closed position) which can limit (prevent) the excessive increase of boost pressure.

Next, in step ST106, based on the EGR valve opening degree and VN opening degree obtained in step ST105 (the throttle opening degree may be included), the driving of the EGR valve 54 and the electric motor 141 of the VN actuator 140 (the throttle motor 60 may be included) is controlled to change the EGR valve opening degree and the VN opening degree to a closed position, thereby causing the VN passage flow rate to be higher than that during the normal control.

In step ST107, it is determined whether or not the time elapsed after the changing of the EGR valve opening degree and the VN opening degree to a closed position has reached a predetermined time Δt. The predetermined time Δt is the time required to pass through the zone A-B of the spatial resonance region Ra of FIG. 9 when the VN passage flow rate during acceleration is set to be a value higher than that during the normal control (the time required to pass through the spatial resonance region Ra is reduced), during acceleration. The predetermined time Δt is set to a value (e.g., 0.5 sec) which has been adapted by conducting an experiment/simulation or the like.

If the time elapsed after the changing of the EGR valve opening degree and the VN opening degree to a closed position has not reached the predetermined time Δt, i.e., the determination result in step ST107 is negative (NO), the routine waits until the elapsed time has reached the predetermined time Δt. Thereafter, when the determination result in step ST107 is positive (YES), i.e., the time elapsed after the changing of the EGR valve opening degree and the VN opening degree to a closed position has reached the predetermined time Δt, the EGR valve opening degree and the VN opening degree (the throttle opening degree may be included) are reset to the opening degrees during the normal control, i.e., the opening degrees for ensuring the target boost pressure (step ST108).

As described above, according to the control of this example, when the VN passage flow rate has reached the flow rate (vna) of the spatial resonance region Ra during acceleration of the engine 1, the EGR valve opening degree and the VN opening degree (the throttle opening degree may be included) are changed to a closed position so that the VN passage flow rate is set to a value higher than that during the normal control. Therefore, the flow rate can quickly shift to a value which does not fall within the spatial resonance region Ra, i.e., the flow rate vnb at point B of FIG. 9. Thus, the spatial resonance region Ra (the zone A-B of FIG. 9) can be quickly passed.

As a result, the time during which the frequency of pressure pulsation occurring at the rear ends of the nozzle vanes 121 is amplified in the spatial resonance region can be reduced, whereby noise caused by the pressure pulsation can be reduced. In addition, in the acceleration process, the EGR valve opening degree and the VN opening degree only need to be changed to a closed position for a short period of time in which the spatial resonance region Ra is passed. Therefore, the noise caused by the pressure pulsation can be reduced while ensuring a requested boost pressure (air amount).

Note that, in the control of this example, the timing of returning to the normal control after the passage through the spatial resonance region Ra is managed based on the time Δt. Alternatively, the routine may be returned to the normal control by determining that the spatial resonance region Ra has been passed (point B of FIG. 9 has been reached).

Here, in the above control of FIG. 10, during acceleration of the engine 1, when the VN passage flow rate (estimated value) has reached the flow rate vna (flow rate at point A in FIG. 9) which falls within the spatial resonance region Ra, the VN passage flow rate is increased. Alternatively, during acceleration of the engine 1, when the pressure pulsation frequency which is in proportion to the VN passage flow rate has reached a frequency which falls within the spatial resonance region Ra, the VN passage flow rate may be increased.

In this case, during acceleration of the engine 1, the VN passage flow rate is estimated by the same process that is performed in step ST103 of FIG. 10, and the estimated VN passage flow rate is successively used to calculate the pressure pulsation frequency from the theoretical equation of the Rankine vortex [$f=St*U/D$]. For example, when the pressure pulsation frequency (calculated value) has reached a frequency which falls within the spatial resonance region Ra of FIG. 9, the driving of the EGR valve 54 and the electric motor 141 of the VN controller 140 may be controlled to change the EGR valve opening degree and the VN opening degree to a closed position, thereby setting the VN passage flow rate to a value higher than that during the normal control.

Note that, also in this case, the causing the VN passage flow rate to be higher than a value during the normal control (the target boost pressure is ensured) may be continued after the pressure pulsation frequency has reached a frequency which falls within the spatial resonance region Ra and until the predetermined time Δt has elapsed, and the routine may be returned to the normal control when the predetermined time Δt has elapsed.

<VN Passage Flow Rate Control During Deceleration>

Figure 11:
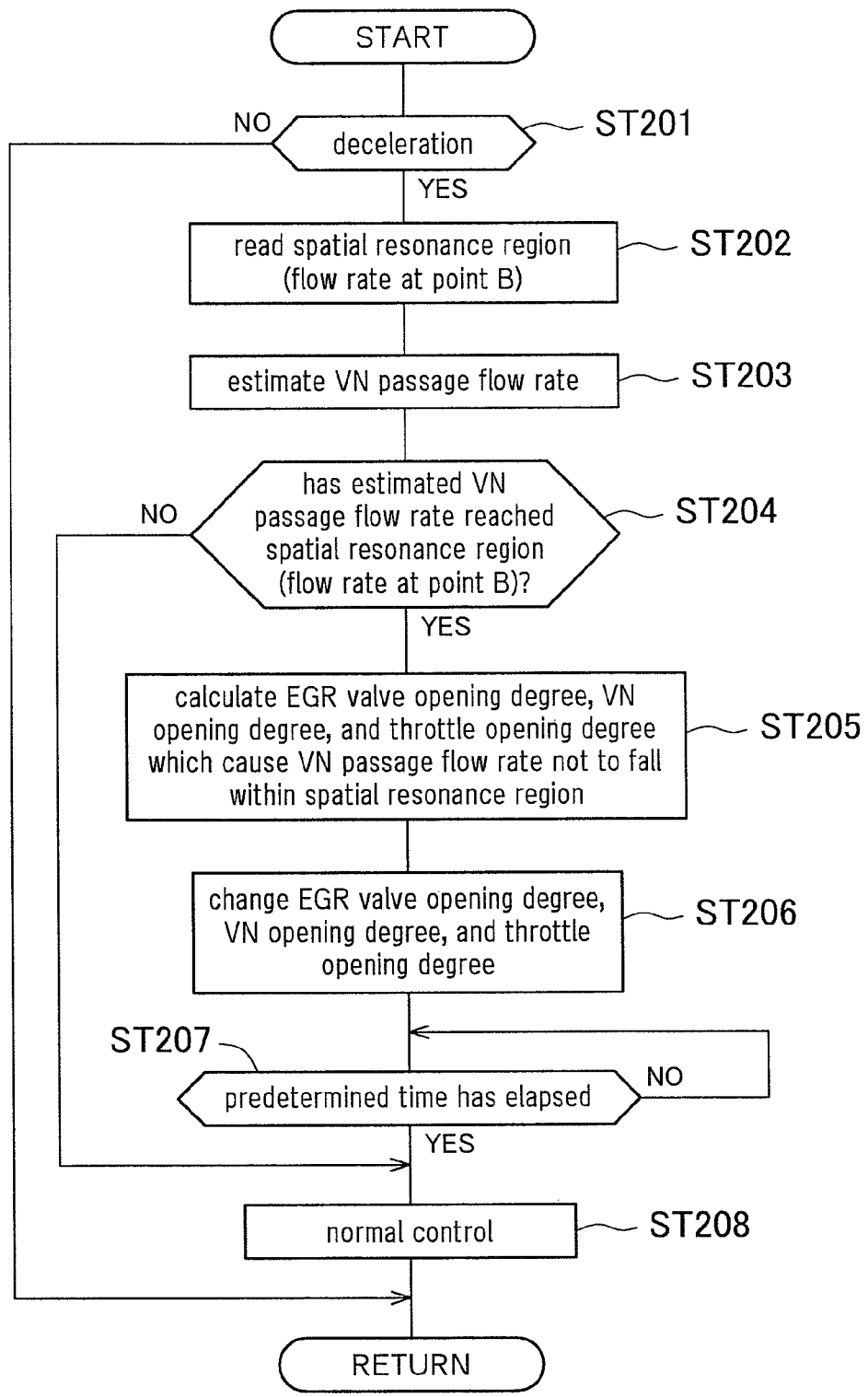
FIG. 11 is a flowchart showing an example VN passage flow rate control during deceleration.

Next, the VN passage flow rate control during deceleration will be described with reference to a flowchart shown in FIG. 11. The control routine of FIG. 11 is repeatedly executed at predetermined intervals (e.g., every several milliseconds) in the ECU 200.

Initially, in step ST201, it is determined whether or not the engine 1 is in a deceleration mode. If the determination result in step ST201 is negative (NO), the routine proceeds to RETURN. If the determination result in step ST201 is positive (YES) (deceleration mode), the routine proceeds to step ST202. Note that, in step ST201, if the accelerator is off (the accelerator opening degree obtained from the output signal of the accelerator opening degree sensor 27 is "0"), it is determined that the engine 1 is in the deceleration mode.

In step ST202, the flow rate vnb (flow rate at point B of FIG. 9) at the upper limit of the spatial resonance region Ra is read.

Next, in step ST203, the VN passage flow rate is estimated. Specifically, the VN passage flow rate is estimated using an estimation map which is previously adapted by conducting an experiment/simulation or the like based on the boost pressure (air amount), the intake gas temperature, the fuel injection amount (burnt gas amount), the throttle opening degree, the EGR valve opening degree, and the VN opening degree, which are parameters relating to the flow amount of exhaust gas flowing toward the turbine wheel 101 (nozzle vanes 121) of the turbocharger 100. Here, of the parameters used for the estimation of the VN passage flow rate, the boost pressure and the intake gas temperature are calculated from the output signals of the intake manifold pressure sensor (boost pressure sensor) 28 and intake air temperature sensor 23, respectively. The throttle opening degree, the EGR valve opening degree, and the VN opening degree are obtained from command values (requested values). Note that the engine 1 is in a fuel-cut state during deceleration (the accelerator is off), and therefore, the fuel injection amount (burnt gas amount) is set to zero in the process of estimating the VN passage flow rate in step ST203.

The process of estimating the VN passage flow rate in step ST203 is repeatedly executed at predetermined intervals (e.g., every several milliseconds) until the determination result in step ST204 is positive (YES). In other words, the estimated value of the VN passage flow rate is successively updated.

Next, in step ST204, it is determined whether or not the VN passage flow rate estimated in step ST203 has reached the flow rate vnb (flow rate at point B in FIG. 9) at the upper limit of the spatial resonance region Ra. If the determination result is negative (NO), a normal control is continued (step ST208). Here, the normal control is to ensure a target boost pressure (air amount). For example, the EGR valve opening degree and the VN opening degree are adjusted by referencing a map (map for the normal control) in which fuel efficiency, emissions, and the like are taken into consideration, based on the current operating state of the engine 1. Note that the throttle opening degree is set to a predetermined opening degree (e.g., "full throttle") after the engine 1 is warmed up.

Thereafter, when the determination result in step ST204 is positive (YES), the EGR valve opening degree, the VN opening degree, and the throttle opening degree with which the VN passage flow rate does not fall within the spatial resonance region Ra are calculated (step ST205). A specific example of such values will be described.

Figure 13:
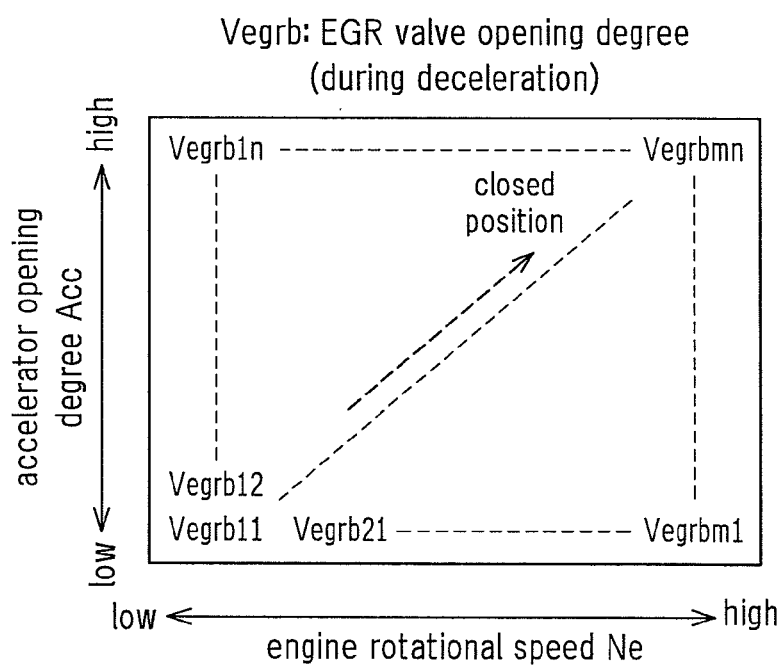
FIG. 13 is a diagram showing an example map for calculation of an EGR valve opening degree (during deceleration).

Firstly, the EGR valve opening degree is calculated using a map shown in FIG. 13. The EGR valve opening degree map of FIG. 13 is produced by mapping values (EGR valve opening degrees: Vegrbs) which have been adapted by conducting an experiment/simulation or the like, taking emissions and the like into consideration, using the engine rotational speed Ne and the accelerator opening degree Acc as parameters. The EGR valve opening degree map of FIG. 13 is stored in the ROM 202 of the ECU 200. Each value (Vegrb) in the map of FIG. 13 is located in a more open position than in the map during the normal control, and is set to a value which is as high as possible within the range in which appropriate emissions can be ensured.

After the EGR valve opening degree (a predetermined value in an open position) has been determined by the above calculation, the VN opening degree is set to a value in an open position, taking drivability or the like into consideration, whenever possible. Similar to the above calculation of the EGR valve opening degree, the VN opening degree may be calculated using a VN opening degree map where the engine rotational speed Ne and the accelerator opening degree Acc are parameters.

Note that, during deceleration, the throttle opening degree may be set to the same value that is used during the normal control (e.g., "full throttle").

Next, in step ST206, based on the EGR valve opening degree and the VN opening degree obtained in step ST205, the driving of the EGR valve 54 and the electric motor 141 of the VN actuator 140 are controlled to change the EGR valve opening degree and the VN opening degree to a more open position than that during the normal control, thereby causing the VN passage flow rate to be lower than that during the normal control.

In step ST207, it is determined whether or not the time elapsed after the changing of the EGR valve opening degree and VN opening degree to an open position has reached a predetermined time Δt. The predetermined time Δt is the time required to pass through the zone B-A of the spatial resonance region Ra of FIG. 9 when the VN passage flow rate during deceleration is set to be a value lower than that during the normal control (the time required to pass through the spatial resonance region Ra is reduced), during deceleration. The predetermined time Δt is set to a value (e.g., 0.5 sec) which has been adapted by conducting an experiment/simulation or the like.

If the time elapsed after the changing of the EGR valve opening degree and VN opening degree to an open position has not reached the predetermined time Δt, i.e., the determination result in step ST207 is negative (NO), the routine waits until the elapsed time has reached the predetermined time Δt. Thereafter, when the determination result in step ST207 is positive (YES), i.e., the time elapsed after the changing of the EGR valve opening degree and the VN opening degree to an open position has reached the predetermined time Δt, the EGR valve opening degree and the VN opening degree are reset to the opening degrees during the normal control (step ST208).

As described above, according to the control of this example, when the VN passage flow rate has reached the flow rate (vnb) of the spatial resonance region Ra during deceleration of the engine 1, the EGR valve opening degree and the VN opening degree are changed to an open position so that the VN passage flow rate is set to a value lower than that during the normal control. Therefore, the flow rate can quickly shift to a value which does not fall within the spatial resonance region Ra, i.e., the flow rate vna at point A of FIG. 9. Thus, the spatial resonance region Ra (the zone B-A of FIG. 9) can be quickly passed.

As a result, the time during which the frequency of pressure pulsation occurring at the rear ends of the nozzle vanes 121 is amplified in the spatial resonance region can be reduced, whereby noise caused by the pressure pulsation can be reduced. In addition, in the deceleration process, the EGR valve opening degree and the VN opening degree only need to be changed to an open position for a short period of time in which the spatial resonance region Ra is passed. Therefore, the noise caused by the pressure pulsation can be reduced while ensuring a requested boost pressure (air amount).

Note that, in the control of this example, the timing of returning to the normal control after the passage through the spatial resonance region Ra is managed based on the time Δt. Alternatively, the routine may be returned to the normal control by determining that the spatial resonance region Ra has been passed (point A of FIG. 9 has been reached).

Here, in the above control of FIG. 11, during deceleration of the engine 1, when the VN passage flow rate (estimated value) has reached the flow rate vnb (flow rate at point B in FIG. 9) which falls within the spatial resonance region Ra, the VN passage flow rate is decreased. Alternatively, during deceleration of the engine 1, when the pressure pulsation frequency which is in proportion to the VN passage flow rate has reached a frequency which falls within the spatial resonance region Ra, the VN passage flow rate may be decreased.

In this case, during deceleration of the engine 1, the VN passage flow rate is estimated by the same process that is performed in step ST203 of FIG. 11, and the estimated VN passage flow rate is successively used to calculate the pressure pulsation frequency from the theoretical equation of the Rankine vortex [f=St*U/D]. Thereafter, for example, when the pressure pulsation frequency (calculated value) has reached a frequency which falls within the spatial resonance region Ra of FIG. 9, the driving of the EGR valve 54 and the electric motor 141 of the VN controller 140 may be controlled to change the EGR valve opening degree and the VN opening degree to an open position, thereby setting the VN passage flow rate to a value lower than that during the normal control.

Note that, also in this case, the causing the VN passage flow rate to be lower than a value during the normal control (the target boost pressure is ensured) may be continued after the pressure pulsation frequency has reached a frequency which falls within the spatial resonance region Ra and until the predetermined time Δt has elapsed, and the routine may be returned to the normal control when the predetermined time Δt has elapsed.

<Other VN Passage Flow Rate Controls During Acceleration And Deceleration>

Next, other VN passage flow rate controls during acceleration and deceleration will be described hereinafter.

(i) An experiment or the like is previously performed on an actual target engine 1 to obtain operating conditions (the engine rotational speed Ne, the load (accelerator opening degree Acc), and the gear ratio in the transmission) under which the VN passage flow rate (pressure pulsation frequency) falls within the spatial resonance region Ra of FIG. 9.

(ii) A VN passage flow rate calculation map is previously produced by an experiment/simulation or the like. In the map, the EGR valve opening degree, the VN opening degree, and the throttle opening degree are adapted so that, during acceleration of the engine 1, the VN passage flow rate does not fall within the spatial resonance region Ra when the operating conditions under which the VN passage flow rate falls within the spatial resonance region Ra are established (these opening degrees are in a more closed position than that during the normal control).

(iii) A VN passage flow rate calculation map is previously produced by an experiment/simulation or the like. In the map, the EGR valve opening degree, the VN opening degree, and the throttle opening degree are adapted so that, during deceleration of the engine 1, the VN passage flow rate does not fall within the spatial resonance region Ra when the operating conditions under which the VN passage flow rate falls within the spatial resonance region Ra are established (these opening degrees are in a more open position than that during the normal control).

In this situation, when the actual operating state (the engine rotational speed Ne, the load (accelerator opening degree Acc), and the gear ratio in the transmission) has reached the spatial resonance region Ra during acceleration of the engine 1, the EGR valve opening degree, the VN opening degree, and the throttle opening degree are calculated based on the VN passage flow rate calculation map (for acceleration), and based the calculated opening degrees, the EGR valve 54, the opening degree of the nozzle vanes 121 (the electric motor 141), and the throttle motor 60 are controlled to cause the VN passage flow rate to be higher than that during the normal control. As a result, the spatial resonance region Ra can be quickly passed.

Also, when the actual operating state (the engine rotational speed Ne, the load (accelerator opening degree Acc), and the gear ratio in the transmission) has reached the spatial resonance region Ra during deceleration of the engine 1, the EGR valve opening degree, the VN opening degree, and the throttle opening degree are calculated based on the VN passage flow rate calculation map (for deceleration), and based the calculated opening degrees, the EGR valve 54, the opening degree of the nozzle vanes 121 (the electric motor 141), and the throttle motor 60 are controlled to cause the VN passage flow rate to be lower than that during the normal control. As a result, the spatial resonance region Ra can be quickly passed.

Thus, also in this example control, the time during which the frequency of pressure pulsation occurring at the rear ends of the nozzle vanes is amplified in the spatial resonance region can be reduced, whereby noise caused by the pressure pulsation can be reduced. In addition, during acceleration and deceleration, the VN passage flow rate only needs to be changed for a short period of time in which the spatial resonance region is passed. Therefore, the noise caused by the pressure pulsation can be reduced while ensuring a requested boost pressure (air amount).

-Other Embodiments-

In the above example, the present invention is applied to a common rail in-cylinder direct-injection multi-cylinder (four-cylinder) diesel engine. The present invention is not limited to this. For example, the present invention is also applicable to diesel engines having any other number of cylinders, such as a six-cylinder diesel engine and the like.

In the above example, the present invention is applied to the control of a diesel engine. The present invention is not limited to this. The present invention is also applicable to the control of a gasoline engine having a variable nozzle vane turbocharger.

In the above example, the present invention is applied to an internal combustion engine (a diesel engine, a gasoline engine, etc.) including an EGR device (an exhaust gas recirculation device). The present invention is not limited to this. The present invention is also applicable to the control of an internal combustion engine with a supercharger (an engine with a variable nozzle vane turbocharger) which does not have an EGR device.

Note that, in the present invention, as an actuator which drives the variable nozzle vane mechanism, a negative-pressure or hydraulic actuator may be used in addition to a motor actuator which employs an electric motor as a drive source.

[Industrial Applicability]

The present invention is applicable to the control of an internal combustion engine (engine) including a variable nozzle vane supercharger, and more particularly, to the control which reduces noise caused by pressure pulsation occurring at the rear ends of nozzle vanes.

REFERENCE SIGNS LIST

1 ENGINE
11 INTAKE AIR PATH
12 EXHAUST GAS PATH
5 EGR DEVICE
54 EGR VALVE
6 THROTTLE VALVE
60 THROTTLE MOTOR
23 INTAKE AIR TEMPERATURE SENSOR
25 ENGINE ROTATIONAL SPEED SENSOR
26 THROTTLE OPENING DEGREE SENSOR
27 ACCELERATOR OPENING DEGREE SENSOR
28 INTAKE MANIFOLD SENSOR (BOOST PRESSURE SENSOR)
100 TURBOCHARGER (VARIABLE NOZZLE VANE TURBOCHARGER)
101 TURBINE WHEEL
102 COMPRESSOR IMPELLER
120 VARIABLE NOZZLE VANE MECHANISM
121 NOZZLE VANE
140 VN ACTUATOR
141 ELECTRIC MOTOR
200 ECU

The invention claimed is:

1. A control device for an internal combustion engine with a supercharger, comprising:
a throttle valve provided in an intake air path;
a supercharger including a compressor impeller provided in the intake air path, a turbine wheel provided in an exhaust gas path, and a variable nozzle vane mechanism having a plurality of nozzle vanes provided at an outer circumference of the turbine wheel and configured to adjust a flow of exhaust gas by changing the opening degree of the nozzle vanes;
a catalyst provided in the exhaust gas path downstream from a turbine housing of the supercharger; and
a flow rate control unit configured to, when the flow rate of exhaust gas passing through the nozzle vanes has reached a flow rate which falls within a spatial resonance region in an exhaust gas passage space between the turbine housing of the supercharger and the catalyst during acceleration or deceleration, adjust one or both of the opening degree of the throttle valve and the opening degree of the nozzle vanes to control the flow rate of exhaust gas passing through the nozzle vanes so that the flow rate of exhaust gas passing through the nozzle vanes does not fall within the spatial resonance region.

2. A control device for an internal combustion engine with a supercharger, comprising:
a throttle valve provided in an intake air path;
a supercharger including a compressor impeller provided in the intake air path, a turbine wheel provided in an exhaust gas path, and a variable nozzle vane mechanism having a plurality of nozzle vanes provided at an outer circumference of the turbine wheel and configured to adjust a flow of exhaust gas by changing the opening degree of the nozzle vanes;
a catalyst provided in the exhaust gas path downstream from a turbine housing of the supercharger; and
a flow rate control unit configured to, when the frequency of pressure pulsation which is in proportion to the flow rate of exhaust gas passing through the nozzle vanes has reached a frequency which falls within a spatial resonance region in an exhaust gas passage space between the turbine housing of the supercharger and the catalyst during acceleration or deceleration, adjust one or both of the opening degree of the throttle valve and the opening degree of the nozzle vanes to control the flow rate of exhaust gas passing through the nozzle vanes so that the pressure pulsation frequency does not fall within the spatial resonance region.

3. A control device for an internal combustion engine with a supercharger, comprising:
a throttle valve provided in an intake air path;
a supercharger including a compressor impeller provided in the intake air path, a turbine wheel provided in an exhaust gas path, and a variable nozzle vane mechanism having a plurality of nozzle vanes provided at an outer circumference of the turbine wheel and configured to adjust a flow of exhaust gas by changing the opening degree of the nozzle vanes;
an EGR valve provided in an EGR path connecting the exhaust gas path upstream from the turbine wheel and the intake air path downstream from the compressor impeller, and configured to adjust the amount of exhaust gas recirculating from the exhaust gas path to the intake air path;
a catalyst provided in the exhaust gas path downstream from a turbine housing of the supercharger; and
a flow rate control unit configured to, when the frequency of pressure pulsation which is in proportion to the flow rate of exhaust gas passing through the nozzle vanes has reached a frequency which falls within a spatial resonance region in an exhaust gas passage space between the turbine housing of the supercharger and the catalyst during acceleration or deceleration, adjust one or more of the opening degree of the throttle valve, the opening degree of the EGR valve, and the opening degree of the nozzle vanes to control the flow rate of exhaust gas passing through the nozzle vanes so that the pressure pulsation frequency does not fall within the spatial resonance region.

4. A control device for an internal combustion engine with a supercharger, comprising:

a throttle valve provided in an intake air path;

a supercharger including a compressor impeller provided in the intake air path, a turbine wheel provided in an exhaust gas path, and a variable nozzle vane mechanism having a plurality of nozzle vanes provided at an outer circumference of the turbine wheel and configured to adjust a flow of exhaust gas by changing the opening degree of the nozzle vanes;

an EGR valve provided in an EGR path connecting the exhaust gas path upstream from the turbine wheel and the intake air path downstream from the compressor impeller, and configured to adjust the amount of exhaust gas recirculating from the exhaust gas path to the intake air path;

a catalyst provided in the exhaust gas path downstream from a turbine housing of the supercharger; and a flow rate control unit configured to, when the flow rate of exhaust gas passing through the nozzle vanes has reached a flow rate which falls within a spatial resonance region in an exhaust gas passage space between the turbine housing of the supercharger and the catalyst during acceleration or deceleration, adjust one or more of the opening degree of the throttle valve, the opening degree of the EGR valve, and the opening degree of the nozzle vanes to control the flow rate of exhaust gas passing through the nozzle vanes so that the flow rate of exhaust gas passing through the nozzle vanes does not fall within the spatial resonance region.

5. The control device for an internal combustion engine with a supercharger of claim 4, wherein the flow rate control unit estimates the flow rate of exhaust gas passing through the nozzle vanes based on a boost pressure, an intake gas temperature, a fuel injection amount, the opening degree of the throttle valve, the opening degree of the EGR valve, and the opening degree of the nozzle vanes, and when the estimated flow rate has reached a flow rate which falls within the spatial resonance region, controls one or more of the opening degree of the throttle valve, the opening degree of the EGR valve, and the opening degree of the nozzle vanes so that the flow rate of exhaust gas passing through the nozzle vanes does not fall within the spatial resonance region.

6. The control device for an internal combustion engine with a supercharger of claim 4, wherein the flow rate control unit, when the flow rate of exhaust gas passing through the nozzle vanes has reached a flow rate which falls within the spatial resonance region during acceleration, controls one or more of the opening degree of the throttle valve, the opening degree of the EGR valve, and the opening degree of the nozzle vanes to increase the flow rate of exhaust gas passing through the nozzle vanes.

7. The control device for an internal combustion engine with a supercharger of claim 6, wherein the flow rate of exhaust gas passing through the nozzle vanes is increased by controlling the opening degree of the nozzle vanes to a closed position after setting the opening degree of the EGR valve to a predetermined value in a closed position.

8. The control device for an internal combustion engine with a supercharger of claim 6, wherein when the flow rate of exhaust gas passing through the nozzle vanes falls within the spatial resonance region, the opening degree of the throttle valve is adjusted to limit an increase in boost pressure.

9. The control device for an internal combustion engine with a supercharger of claim 6, wherein during acceleration, the control which increases the flow rate of exhaust gas passing through the nozzle vanes is continued after the flow rate of exhaust gas passing through the nozzle vanes has reached a flow rate which falls within the spatial resonance region and until a predetermined time has elapsed.

10. The control device for an internal combustion engine with a supercharger of claim 4, wherein the flow rate control unit, when the flow rate of exhaust gas passing through the nozzle vanes has reached a flow rate which falls within the spatial resonance region during deceleration, controls one or more of the opening degree of the throttle valve, the opening degree of the EGR valve, and the opening degree of the nozzle vanes to decrease the flow rate of exhaust gas passing through the nozzle vanes.

11. The control device for an internal combustion engine with a supercharger of claim 10, wherein the flow rate of exhaust gas passing through the nozzle vanes is decreased by controlling the opening degree of the nozzle vanes to an open position after setting the opening degree of the EGR valve to a predetermined value in an open position.

12. The control device for an internal combustion engine with a supercharger of claim 10, wherein during deceleration, the control which decreases the flow rate of exhaust gas passing through the nozzle vanes is continued after the flow rate of exhaust gas passing through the nozzle vanes has reached a flow rate which falls within the spatial resonance region and until a predetermined time has elapsed.

* * * * *